(12) United States Patent
Shinbo

(10) Patent No.: US 6,407,379 B1
(45) Date of Patent: Jun. 18, 2002

(54) INFORMATION PROCESSOR

(75) Inventor: Akira Shinbo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/555,438

(22) PCT Filed: Sep. 14, 1999

(86) PCT No.: PCT/JP99/05031

§ 371 (c)(1),
(2), (4) Date: Jul. 21, 2000

(87) PCT Pub. No.: WO00/19172

PCT Pub. Date: Apr. 6, 2000

(30) Foreign Application Priority Data

Sep. 30, 1998 (JP) ............................................. 10-278970

(51) Int. Cl.⁷ ................................................. G01D 5/00
(52) U.S. Cl. .............................. 250/231.13; 250/231.18
(58) Field of Search ....................... 250/231.14, 231.16, 250/231.18, 231.17, 231.13, 559.29, 338.1, 338.2; 341/13, 137

(56) References Cited

U.S. PATENT DOCUMENTS 4,914,831 A * 4/1990 Kanezashi et al. ............. 33/780
4,947,166 A * 8/1990 Wingate et al. ................ 341/13
5,103,225 A * 4/1992 Dolan et al. .................... 341/3
6,291,815 B1 * 9/2001 Sugiyama et al. ....... 250/231.13

FOREIGN PATENT DOCUMENTS

| JP | 58-36494 | 8/1956 |
| JP | 61-186889 | 8/1986 |
| JP | 4-138295 | 12/1992 |
| JP | 50-73339 | 12/1992 |

* cited by examiner

Primary Examiner—Robert H. Kim
Assistant Examiner—Hoon K. Song

(57) ABSTRACT

An object is to provide an information processing device that permits information to be reliably entered by an easy operation, and has a configuration that permits easy reduction in size. A pulse count detection sensor unit 32 and a rotational direction detection sensor unit 33 apply infrared light to an optical pattern formed under a rotating bezel, and generate pulse signals from the reflected light. Based on these pulse signals, an amount of rotation and a direction of rotation of the rotating bezel are detected. Furthermore, a home position detection sensor unit 10 applies visible light to the optical pattern, and generates a pulse signal from the reflected light. At one location of the optical pattern of the rotating bezel, a region that reflects infrared light and absorbs visible light is formed. When the home position detection sensor unit 10 detects the region, values of pulse signals generated by the home position detection sensor unit 10 and the pulse count detection sensor unit 32 differ, thus allowing a home position to be detected.

24 Claims, 16 Drawing Sheets

INFORMATION PROCESSOR

TECHNICAL FIELD

The present invention relates to an information processing device using a rotator to input information.

BACKGROUND ART

Conventionally, an apparatus has been used that employs a two-phase encoder that detects an amount of rotation of a rotator by using two photosensors and detects a direction of rotation of the rotator by comparing detection results of the photosensors. When such a two-phase encoder is employed as an input device, and input information based on an amount of rotation of the rotator is created, input information based on the amount of rotation is stored in advance. For this reason, in such an apparatus, a reference position at which detection of the amount of rotation is started is decided beforehand, and the detection of the amount of rotation is started at the reference position.

As a method for starting the detection of the amount of rotation and a direction of rotation at the reference position, a method is conceivable in which a user rotates a rotator to a reference position, then depresses a switch or the like for instructing the start of detecting the amount of rotation and the direction of rotation. This method, however, requires a complicated operation and poses a problem such as one in that an operation error is apt to happen.

In addition to the method in which a user manually adjusts a reference position, there is another method in which the reference position is automatically detected. In the method for automatically detecting the reference position, a reference position pattern is formed on a rotator in addition to a pattern for detecting the amount of rotation and the direction of rotation mentioned above, and the rotator is further provided with a sensor for detecting the reference position pattern. According to the method, the detection of the amount of rotation is begun at the moment when the sensor for detecting the reference position pattern detects the reference position pattern.

However, to detect the reference position by the conventional method described above, it is necessary to form the reference position pattern concentrically with the pattern for detecting the amount of rotation and the direction of rotation, making it difficult to reduce a size of the rotator.

DISCLOSURE OF INVENTION

The present invention has been made in view of the foregoing, and it is an object thereof to provide an information processing device that permits more reliable input of information by an easy operation and has a configuration that allows a size of the unit to be easily reduced.

To this end, an information processing device according to the present invention includes: a support member; a rotator rotatably provided on the support member; an optical pattern having a reflecting region for reflecting visible light and infrared light and an absorbing region for absorbing the visible light and the infrared light, which are alternately disposed along a circumference of the rotator, and a reference position region disposed in place of one of the reflecting regions and which reflects the infrared light and absorbs the visible light; an infrared light sensor provided on the support member and which applies the infrared light to the optical pattern and receives the reflected light; a visible light sensor provided on the support member and which applies the visible light to the optical pattern and receives the reflected light; reference position detecting means for detecting the reference position region based on a quantity of received light of the infrared light sensor and a quantity of received light of the visible light sensor; rotation detecting means for detecting, based on the quantity of the received light of the infrared light sensor, an amount of rotation of the rotator from a moment when the reference position region is detected by the reference position detecting means and a direction of rotation of the rotator; signal generating means for generating an information signal based on the amount of rotation and the direction of rotation of the rotator detected by the rotation detecting means; and displaying means for displaying information corresponding to the information signal generated by the signal generating means.

Furthermore, an information processing device according to another embodiment of the invention includes: a support member; a rotator rotatably provided on the support member; an optical pattern having a reflecting region for reflecting visible light and infrared light, an absorbing region for absorbing the visible light and the infrared light, which are alternately disposed along a circumference of the rotator, and a reference position region disposed in place of one of the reflecting regions and which reflects the visible light and absorbs the infrared light; an infrared light sensor provided on the support member and which applies the infrared light to the optical pattern and receives the reflected light; a visible light sensor provided on the support member and which applies the visible light to the optical pattern and receives the reflected light; reference position detecting means for detecting the reference position region based on a quantity of received light of the infrared light sensor and a quantity of received light of the visible light sensor; rotation detecting means for detecting, based on the quantity of the received light of the visible light sensor, an amount of rotation of the rotator from a moment when the reference position region is detected by the reference position detecting means, and a direction of rotation of the rotator; signal generating means for generating an information signal based on the amount of rotation and the direction of rotation of the rotator detected by the rotation detecting means; and displaying means for displaying information corresponding to the information signal generated by the signal generating means.

Furthermore, an information processing device according to yet another embodiment of the invention includes: a support member; a rotator rotatably provided on the support member; an optical pattern having a reflecting region for reflecting visible light and infrared light, an absorbing region for absorbing the visible light and the infrared light, which are alternately disposed along a circumference of the rotator, and a reference position region disposed in place of one of the absorbing regions and which reflects the infrared light and absorbs the visible light; an infrared light sensor provided on the support member and which applies the infrared light to the optical pattern and receives the reflected light; a visible light sensor provided on the support member and which applies the visible light to the optical pattern and receives the reflected light; reference position detecting means for detecting the reference position region based on a quantity of received light of the infrared light sensor and a quantity of received light of the visible light sensor; rotation detecting means for detecting, based on the quantity of received light of the visible light sensor, an amount of rotation of the rotator from a moment when the reference position region is detected by the reference position detecting means and a direction of rotation of the rotator; signal generating means for generating an information signal based on the amount of rotation and the direction of rotation of the rotator detected by the rotation detecting means; and displaying means for displaying information corresponding to the information signal generated by the signal generating means.

Furthermore, an information processing device according to still yet another embodiment of the invention includes: a support member; a rotator rotatably provided on the support member; an optical pattern having a reflecting region for reflecting visible light and infrared light, an absorbing region for absorbing the visible light and the infrared light, which are alternately disposed along a circumference of the rotator, and a reference position region disposed in place of one of the absorbing regions and which reflects the visible light and absorbs the infrared light; an infrared light sensor provided on the support member and which applies the infrared light to the optical pattern and receives the reflected light; a visible light sensor provided on the support member and which applies the visible light to the optical pattern and receives the reflected light; reference position detecting means for detecting the reference position region based on a quantity of received light of the infrared light sensor and a quantity of received light of the visible light sensor; rotation detecting means for detecting, based on a quantity of received light of the infrared light sensor, an amount of rotation of the rotator from a moment when the reference position region is detected by the reference position detecting means and a direction of rotation of the rotator; signal generating means for generating an information signal based on the amount of rotation and the direction of rotation of the rotator detected by the rotation detecting means; and displaying means for displaying information corresponding to the information signal generated by the signal generating means.

Furthermore, an information processing device according to another embodiment of the invention is the information processing device according to any one of the above embodiments, wherein the rotator is an annular rotating bezel, and the support member is formed to be a wristwatch type having a main body section and a band section that can be wrapped around a wrist of a user, the main body section having a hermetically sealed space wherein the infrared light sensor and the visible light sensor are disposed.

Furthermore, an information processing device according to yet another embodiment of the invention includes: a support member; a rotator rotatably provided on the support member; an optical pattern having a reflecting region for reflecting visible light and infrared light and an absorbing region for absorbing the visible light and the infrared light, which are alternately disposed along a circumference of the rotator, and a reference position region disposed in place of one of the reflecting regions and which reflects the infrared light and absorbs the visible light; a photosensor provided on the support member and which has a luminescent element that applies the infrared light and the visible light to the optical pattern, and a light-receiving element that receives reflected light from the optical pattern; reference position detecting means for detecting the reference position region based on a quantity of received infrared light and a quantity of received visible light in the light-receiving element of the photosensor; rotation detecting means for detecting, based on a quantity of the received infrared light in the light-receiving element of the photosensor, an amount of rotation of the rotator from a moment when the reference position region is detected by the reference position detecting means and a direction of rotation of the rotator; signal generating means for generating an information signal based on the amount of rotation and the direction of rotation of the rotator detected by the rotation detecting means; and displaying means for displaying information corresponding to the information signal generated by the signal generating means.

Furthermore, an information processing device according to still yet another embodiment of the invention includes: a support member; a rotator rotatably provided on the support member; an optical pattern having a reflecting region for reflecting visible light and infrared light and an absorbing region for absorbing the visible light and the infrared light, which are alternately disposed along a circumference of the rotator, and a reference position region disposed in place of one of the reflecting regions and which reflects the visible light and absorbs the infrared light; a photosensor provided on the support member and which has a luminescent element that applies the infrared light and the visible light to the optical pattern, and a light-receiving element that receives reflected light from the optical pattern; reference position detecting means for detecting the reference position region based on a quantity of received infrared light and a quantity of received visible light in the light-receiving element of the photosensor; rotation detecting means for detecting, based on an amount of the received visible light in the light-receiving element of the photosensor, an amount of rotation of the rotator from a moment when the reference position region is detected by the reference position detecting means and a direction of rotation of the rotator; signal generating means for generating an information signal based on the amount of rotation and the direction of rotation of the rotator detected by the rotation detecting means; and displaying means for displaying information corresponding to the information signal generated by the signal generating means.

Furthermore, an information processing device according to another embodiment of the invention includes: a support member; a rotator rotatably provided on the support member; an optical pattern having a reflecting region for reflecting visible light and infrared light and an absorbing region for absorbing the visible light and the infrared light, which are alternately disposed along a circumference of the rotator, and a reference position region disposed in place of one of the absorbing regions and which reflects the infrared light and absorbs the visible light; a photosensor provided on the support member and which has a luminescent element that applies the infrared light and the visible light to the optical pattern, and a light-receiving element that receives reflected light from the optical pattern; reference position detecting means for detecting the reference position region based on a quantity of received infrared light and a quantity of received visible light in the light-receiving element of the photosensor; rotation detecting means for detecting, based on a quantity of the received visible light in the light-receiving element of the photosensor, an amount of rotation of the rotator from a moment when the reference position region is detected by the reference position detecting means and a direction of rotation of the rotator; signal generating means for generating an information signal based on the amount of rotation and the direction of rotation of the rotator detected by the rotation detecting means; and displaying means for displaying information corresponding to the information signal generated by the signal generating means.

Furthermore, an information processing device according to yet another embodiment of the present invention includes: a support member; a rotator rotatably provided on the support member; an optical pattern having a reflecting region for reflecting visible light and infrared light and an absorbing region for absorbing the visible light and the infrared light, which are alternately disposed along a circumference of the rotator, and a reference position region disposed in place of one of the absorbing regions and which reflects the visible light and absorbs the infrared light; a photosensor provided on the support member and which has a luminescent element that applies the infrared light and the visible light to the optical pattern, and a light-receiving element that receives reflected light from the optical pattern; reference position detecting means for comparing a quantity of received infrared light and a quantity of received visible light in the light-receiving element of the photosensor to detect the reference position region based on a result of the comparison; rotation detecting means for detecting, based on a quantity of the received infrared light in the light-receiving element of the photosensor, an amount of rotation of the rotator from a moment when the reference position region is detected by the reference position detecting means and a direction of rotation of the rotator; signal generating means for generating an information signal based on the amount of rotation and the direction of rotation of the rotator detected by the rotation detecting means; and displaying means for displaying information corresponding to the information signal generated by the signal generating means.

Furthermore, an information processing device according to still yet another embodiment of the present invention is the information processing device according to any one of the last three embodiments, wherein the rotator is an annular rotating bezel, and the support member is formed to be a wristwatch type having a main body section and a band section that can be wrapped around a wrist of a user, the main body section having a hermetically sealed space wherein the photosensor is disposed.

Furthermore, an information processing device according to another embodiment of the present invention is the information processing device according to one of the previous embodiments, wherein a plurality of the reference position regions are disposed in place of any one of the reflecting regions.

Furthermore, an information processing device according to yet another embodiment of the present invention is the information processing device according to one of the previous embodiments, wherein a plurality of the reference position regions are disposed in place of any one of the absorbing regions.

"A" in the diagram shows an optical pattern on the pulse count detection sensor unit, DPi in the diagram shows a drive pulse of an LED (infrared light), DPv in the diagram shows a drive pulse of an LED (visible light), PD in the diagram shows an output value of a photodiode, Wdpi shows a sampling hold waveform corresponding to the infrared light, and Wdpv shows a sampling hold waveform corresponding to the visible light.

Figure 18:
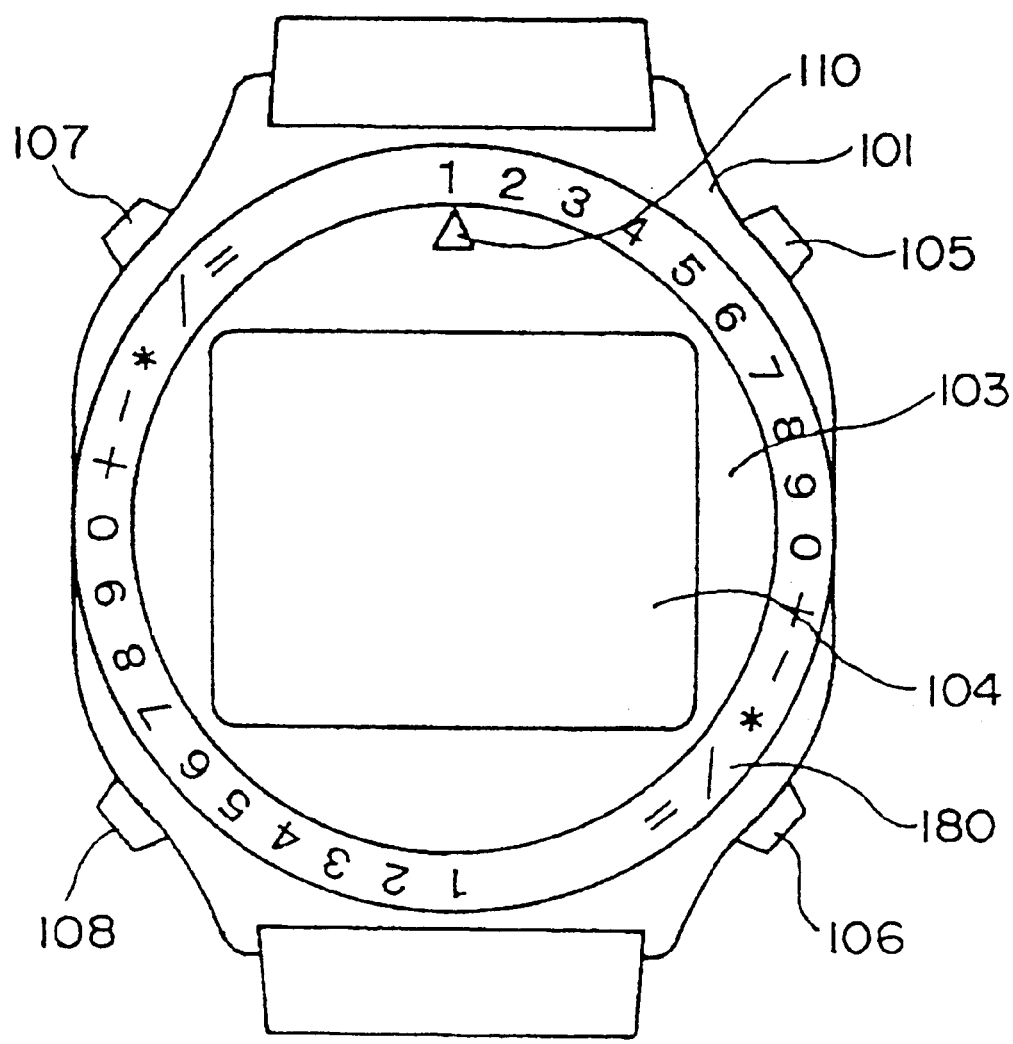

FIG. 18 is a front view of a modification example of the wristwatch type information processing device according to the first to third embodiments.

BEST MODE FOR CARRYING OUT THE INVENTION

The following will describe embodiments of the present invention with reference to the accompanying drawings.

A. First Embodiment

A-1. Configuration

Figure 1:
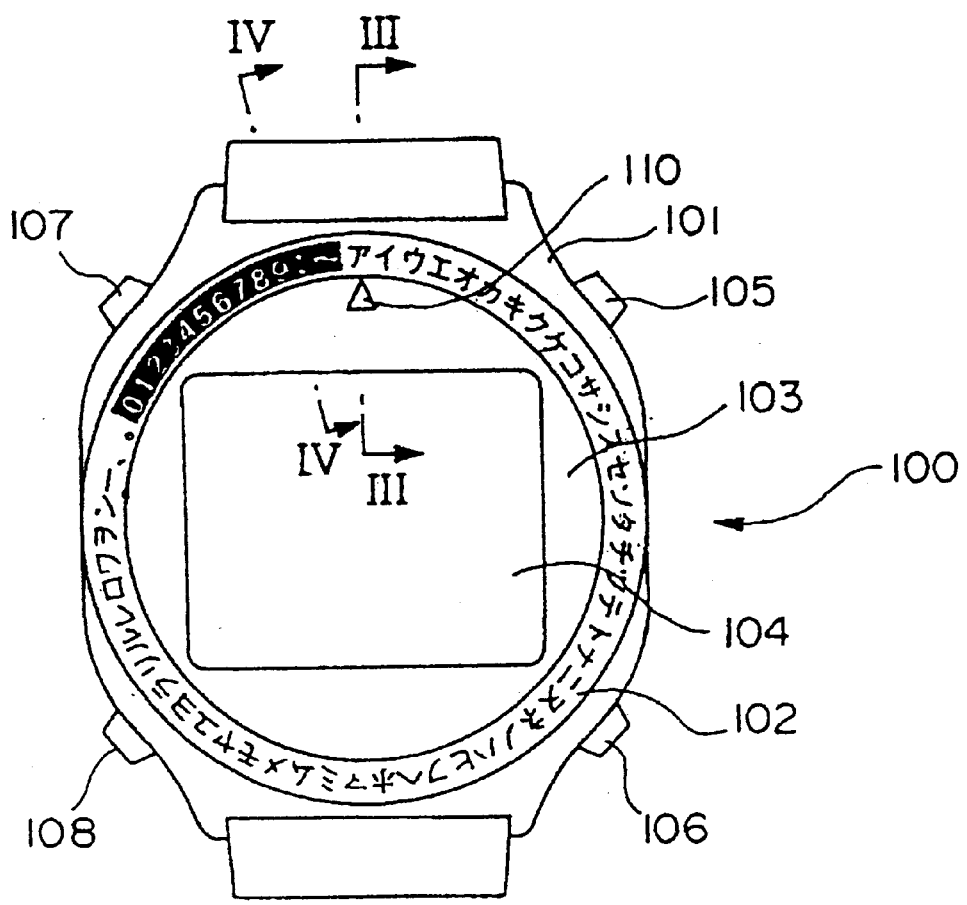
FIG. 1 is a front view of a wristwatch type information processing device according to a first embodiment of the present invention.

First, FIG. 1 is a front view of a wristwatch type information processing device 100 in accordance with a first embodiment of the present invention. In the drawing, reference numeral 101 denotes a main body of the wristwatch type information processing device 100. on a top (on this side in the paper surface) section of the main body (support member) 101, a rotating bezel (rotator) 102 formed to be an annular shape is disposed such that it is slidable with respect to the main body 101. Furthermore, on a top surface of the rotating bezel 102, characters or the like, such as "katakana characters a, i, u (the angular phonetic Japanese syllabary) and so on, 9, :,~", are formed at equal intervals by printing or the like.

On an inner periphery side of the rotating bezel 102, a cover glass 103 is provided. A display section (displaying means) 104 composed of a publicly known display device, such as a liquid crystal panel, on which information or the like input to the wristwatch type information processing device 100 is displayed is provided under the cover glass 103 (on a rear side of the paper surface). On an upper side of the display section 104 in the drawing, a pointer mark 110 that points at one of the characters or the like formed on the rotating bezel 102 is formed by printing or the like. Furthermore, a confirmation switch 105, a deletion switch 106, a sonant mark switch 107, and a mode selector switch 108 are respectively provided around the main body 101. These switches may alternatively provided on the cover glass 103.

Figure 2:
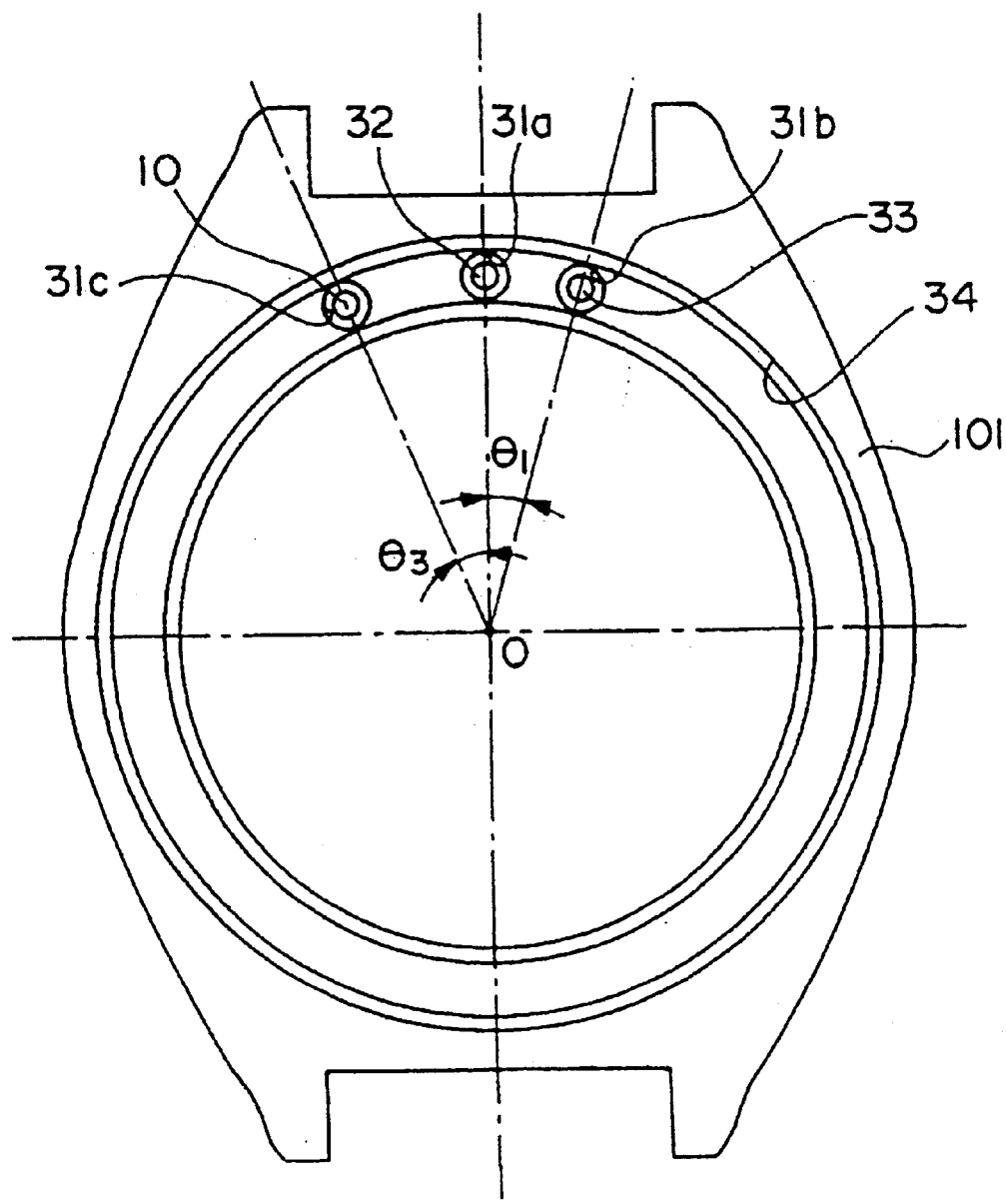
FIG. 2 is a diagram showing a state wherein a rotating bezel has been removed from the wristwatch type information processing device.

FIG. 2 shows a state wherein the rotating bezel 102 has been removed from the wristwatch type information processing device 100. As shown in the drawing, holes 31a, 31b, and 31c are formed in the main body 101, and a pulse count detection sensor unit (infrared light sensor) 32, a rotational direction detection sensor unit (infrared light sensor) 33, and a home position detection sensor unit (visible light sensor) 10 are respectively disposed in the holes 31a, 31b, and 31c.

The pulse count detection sensor unit 32 and the rotational direction detection sensor unit 33 are respectively disposed such that a line connecting the pulse count detection sensor unit 32 and a center O of rotation of the rotating bezel 102 and a line connecting the rotational direction detection sensor unit 33 and the center O of rotation form an angle $\theta_1$. Furthermore, the pulse count detection sensor unit 32 is disposed at a character (a bottom surface of the rotating bezel 102 that is associated with a katakana character "a" (the angular phonetic Japanese syllabary) in the case of FIG. 1) indicated by the aforesaid pointer mark 110. The home position detection sensor unit 10 is disposed such that a line connecting the pulse count detection sensor unit 32 and the center O of rotation and a line connecting the home position detection sensor unit 10 and the center O of rotation form an angle $\theta_3$. Angles $\theta_1$ and $\theta_3$ will be discussed hereinafter.

Figure 3:
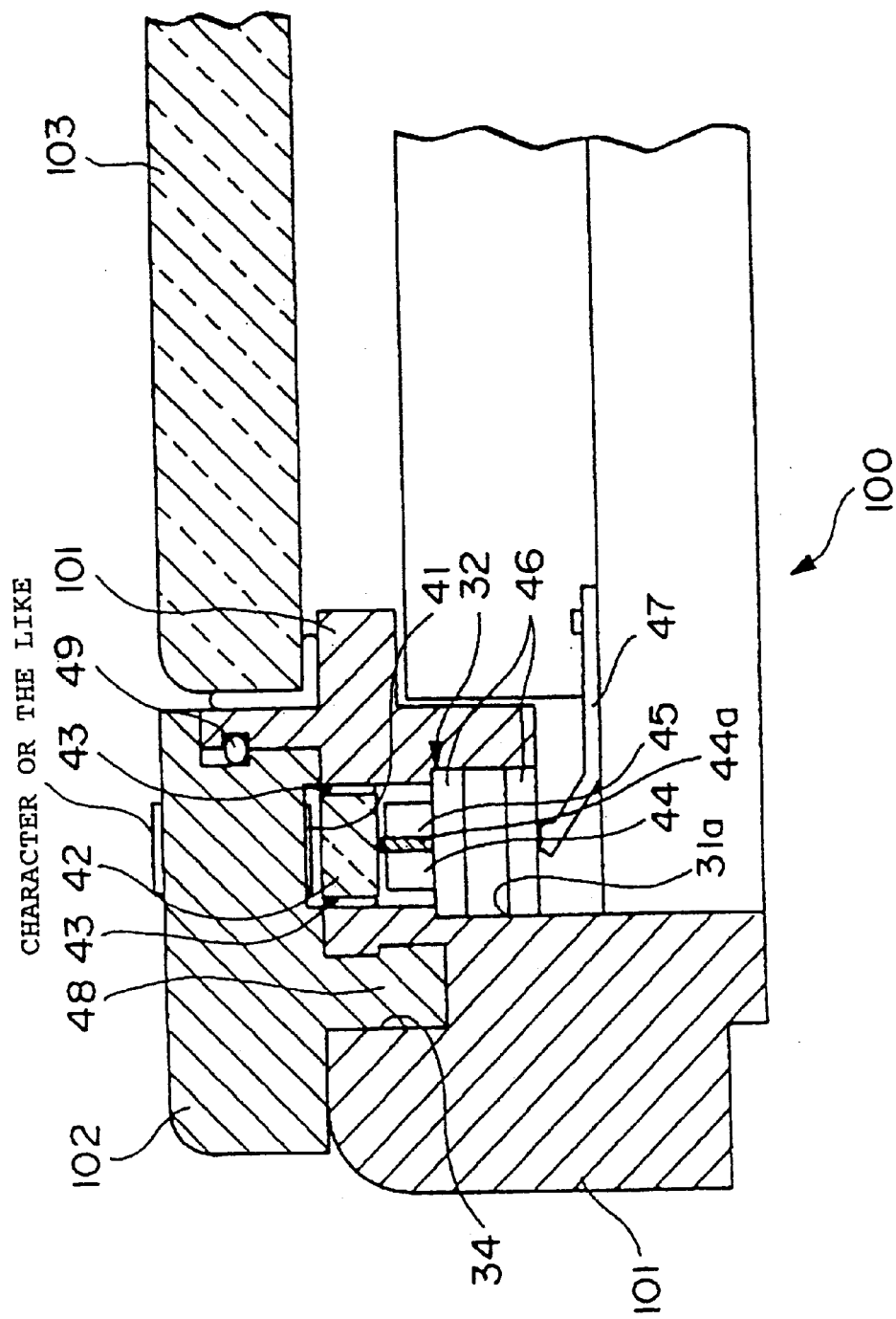
FIG. 3 is a view taken along a line III—III of FIG. 1.

FIG. 3 is a view taken along a line III—III of FIG. 1. As shown in the drawing, on the bottom surface of the rotating bezel 102, an optical pattern 41 is formed in a position associated with characters or the like formed on a top surface of the rotating bezel 102. Under the surface on which the optical pattern 41 is formed, a sensor cover glass 42 is mounted on the main body 101.

At this time, a gasket 43 is provided between the main body 101 and a sensor cover glass 42 to prevent water or the like from entering under the sensor cover glass 42.

The pulse count detection sensor unit 32 is provided below the sensor cover glass 42. The pulse count detection sensor unit 32 is constituted by an LED (Light Emitting Diode) 44 for applying infrared light (of, for example, a wavelength of approximately 95 nm), a photodiode 45, a light-shielding plate 44a disposed between the LED 44 and the photodiode 45, and boards 46. When the pulse count detection sensor unit 32 is operated, the LED 44 applies infrared light to the optical pattern 41, and the reflected light is received by the photodiode 45. Then, based on a quantity of the light received by the photodiode 45, a pulse signal is generated. A number of pulses of the pulse signal generated by the pulse count detection sensor unit 32 as mentioned above is counted by an information signal generating section (refer to FIG. 10), which will be described hereinafter, so as to detect an amount of rotation of the rotating bezel 102. The rotational direction detection sensor unit 33 shares the same construction as that of the pulse count detection sensor unit 32 set forth above, and it reads the optical pattern 41 formed on the rotating bezel 102 and produces a pulse signal.

A contact spring 47 is provided below the substrates 46 of the pulse count detection sensor unit 32. The contact spring 47 provides electrical connection between the pulse count detection sensor unit 32 and a CPU or the like, which is not shown, of the wristwatch type information processing device 100. A lead wire may be provided in place of the contact spring 47.

As shown in FIG. 2 and FIG. 3, a groove 34 is formed in a circumference of a top portion of the main body 101. Furthermore, as shown in FIG. 3, a protuberance 48 jutting out downward is formed on the bottom surface of the rotating bezel 102, the protuberance 48 being slidably fitted in the groove 34. In addition, an O ring 49 is disposed between a side surface of the rotating bezel 102 on the right side in the drawing and the main body 101 to prevent water or light from entering into the wristwatch type information processing device 100.

Figure 4:
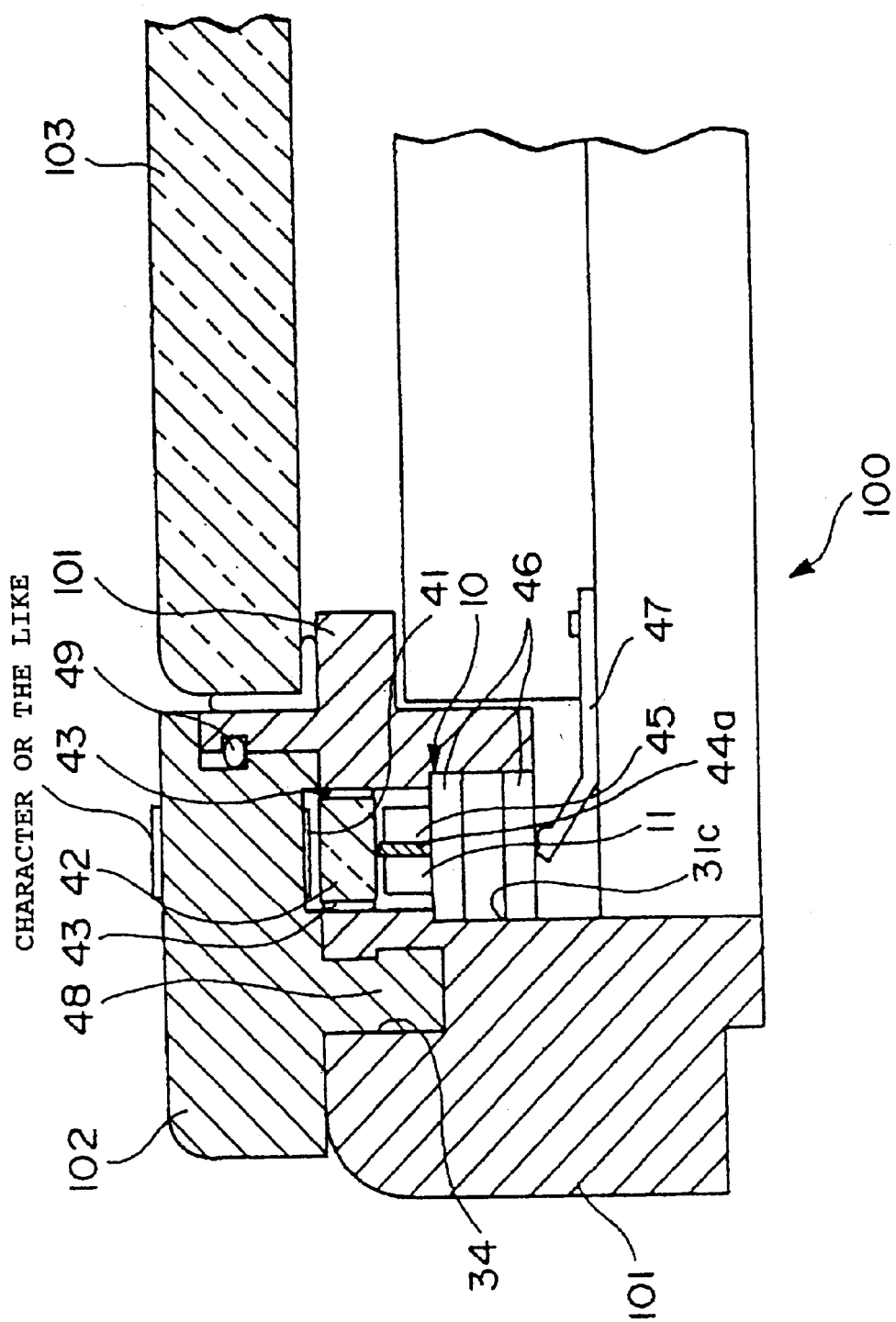
FIG. 4 is a view taken along a line IV—IV of FIG. 1.

As shown in FIG. 4, the home position detection sensor unit 10 disposed in the hole 31c is constituted by an LED 11 for applying visible light (of, for example, a wavelength of approximately 630 nm), the photodiode 45, the light-shielding plate 44a disposed between the LED 11 and the photodiode 45, and boards 46. When the home position detection sensor unit 10 is operated, the LED 11 applies visible light to the optical pattern 41, and the reflected light is received by the photodiode 45. Then, based on a quantity of the light received by the photodiode 45, a pulse signal is generated.

Figure 5:
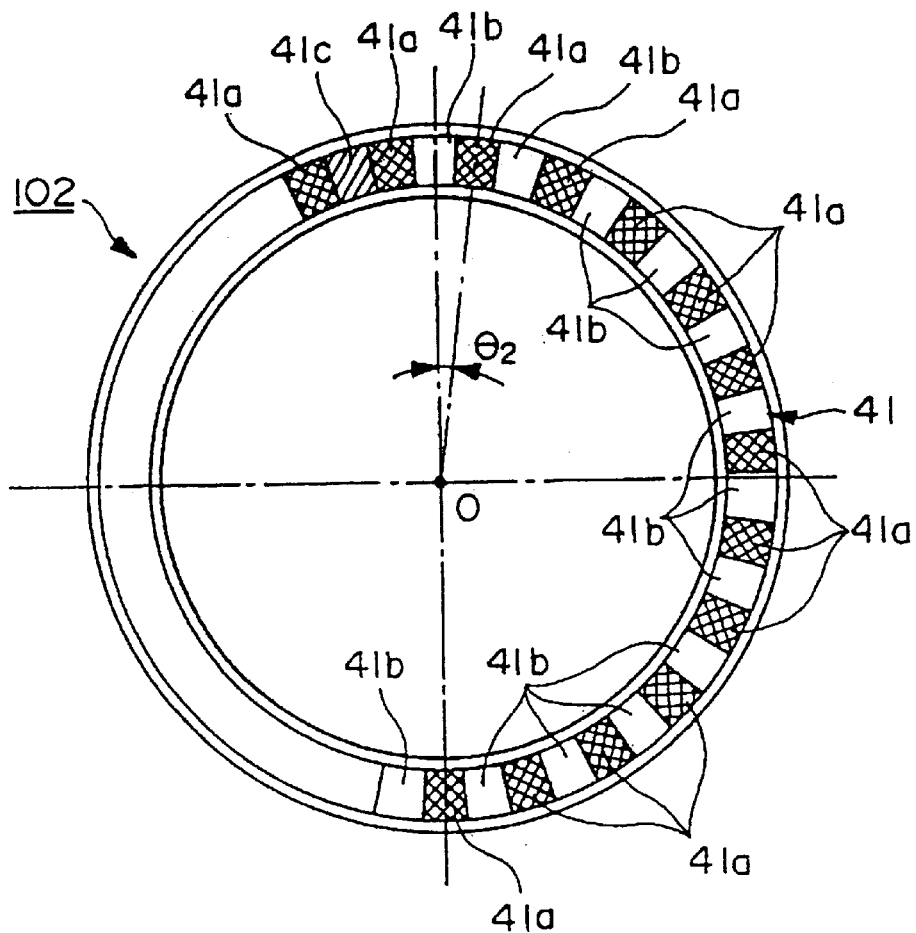
FIG. 5 is a view showing a bottom surface of the rotating bezel.

FIG. 5 is a diagram showing the bottom surface of the rotating bezel 102. With reference to FIG. 5, the optical pattern 41 will be described. As shown in the drawing, the optical pattern 41 has absorbing regions 41a that absorb the infrared light and visible light applied by the LED 44 and the LED 11, and reflecting regions 41b, the absorbing regions 41a and the reflecting regions 41b being alternately disposed along a rotation circumference of the rotating bezel 102. Furthermore, at one location where the reflecting region 41b should be disposed, a visible light absorbing region (a reference position region) 41c that reflects infrared light and absorbs visible light is disposed in place of the reflecting region 41b. The visible light absorbing region 41c is disposed so that it is located above the home position detection sensor unit 10 when the rotating bezel 102 is in a home position (a reference position), which will be discussed hereinafter. In this embodiment, the home position refers to a state wherein the rotating bezel 102 is at the position shown in FIG. 1, that is, the katakana character "a" is pointed at by the pointer mark 110.

For the absorbing regions 41a, printing ink, a pigment, or the like that contains carbon or the like and has a high-density color (e.g. black) is used. For the reflection regions 41b, a white sheet or an aluminum constituent or other metal material is used. For the visible light absorbing region 41c, a constituent made by immersing an aluminum material in a liquid containing potassium permanganate or manganese sulfate to color it may be used. As an alternative, a constituent made by immersing an anodized aluminum material in a liquid containing potassium permanganate or manganese sulfate to color it may be used, or a constituent made by anodizing an aluminum material by oxalic acid or the like to form a porous film, then by anodizing it by nickel salt, cobalt salt, or the like may be used. As a further alternative, a chemically colored iron or zinc constituent, or other constituents may be used for the visible light absorbing region 41c as long as it exhibits high reflectance to infrared light and high absorbance of visible light.

Figure 6:
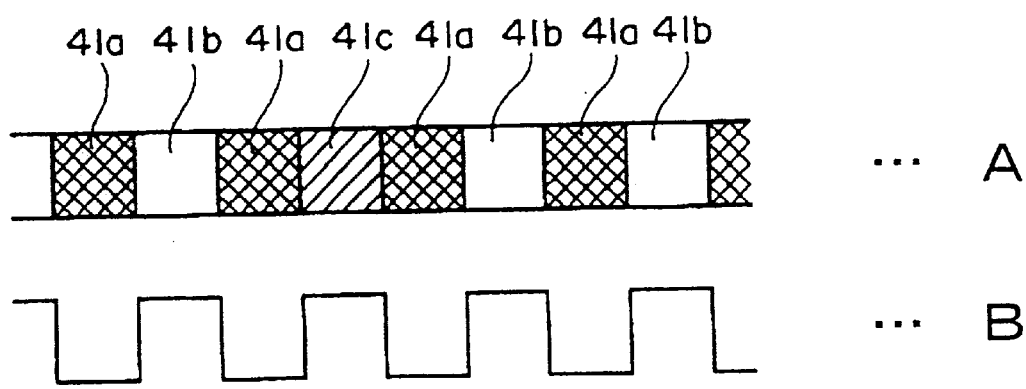
FIG. 6 is a view for explaining a process in which a pulse count detection sensor unit, which is a component of the wristwatch type information processing device, generates a pulse signal B from an optical pattern A formed on the rotating bezel.

The absorbing regions 41a and the reflecting regions 41b, or the absorbing regions 41a and the visible light absorbing region 41c are formed at every angle $\theta_2$ around the center O of rotation of the rotating bezel 102. If there are an n ("n" is an even number) number of characters or the like formed on the top surface of the aforesaid rotating bezel 102, then $\theta_2=360/n°$. When a user turns the rotating bezel 102, the pulse count detection sensor unit 32 reads the absorbing regions 41a and the reflecting regions 41b alternately so as to produce a pulse signal shown in FIG. 6. In this case, since the pulse count detection sensor unit 32 has the LED 44 for applying infrared light, a sufficient quantity of light is received by the photodiode 45 when the visible light absorbing region 41c is read. Hence, when the pulse count detection sensor unit 32 reads the visible light absorbing region 41c, an H-level signal is obtained. When the rotational direction detection sensor unit 33 reads the optical pattern 41, the same pulse signal as that of the pulse count detection sensor unit 32 is generated.

Figure 7:
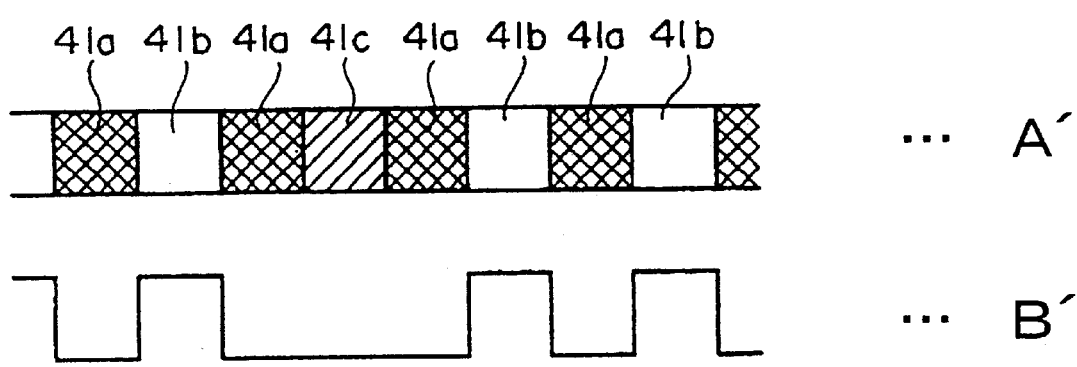
FIG. 7 is a view for explaining a process in which an home position detection sensor unit, which is a component of the wristwatch type information processing device, generates a pulse signal B' from an optical pattern A' formed on the rotating bezel.

Furthermore, when the home position detection sensor unit 10 reads the optical pattern 41, a pulse signal as shown in FIG. 7 is obtained. As shown in the drawing, when the home position detection sensor unit 10 reads the absorbing regions 41a and the reflecting regions 41b, the same signal as those of the pulse count detection sensor unit 32 and the rotational direction detection sensor unit 33 is obtained. However, the LED 11 in the home position detection sensor unit 10 is radiating visible light, so that, when the visible light absorbing region 41c is read, a sufficient quantity of light is not received by the photodiode 45, and an L-level signal will be generated.

A method of generating pulse signals of the sensor units in this embodiment will now be described. In the wristwatch type information processing device 100, the LED 44 and the LED 11 are pulse-driven at a predetermined frequency. An output voltage of the photodiode 45 is sampling-held within the pulse, i.e., at a fixed timing while the LED 44 and the LED 11 are being driven. Output values thus sample-held are compared with predetermined threshold values to produce the pulse signals mentioned above. Alternatively, the LED 44 and the LED 11 may be constantly driven, and voltage values obtained at the photodiode 45 may be sample-held at a predetermined timing.

Descriptions will now be given of the angle θ1 between the pulse count detection sensor unit 32 and the rotational direction detection sensor unit 33 (refer to FIG. 2) and angle $\theta_3$ between the pulse count detection sensor unit 32 and the home position detection sensor unit 10 (refer to FIG. 2). In this embodiment, the pulse count detection sensor unit 32 and the rotational direction detection sensor unit 33 are disposed to provide $\theta_1=\theta_2+\theta_2/2$. Thus, when the rotating bezel 102 is turned by the user, a ¼ phase difference will be produced between the pulse signal produced by the pulse count detection sensor unit 32 and the pulse signal produced by the rotational direction detection sensor unit 33.

Figure 8:
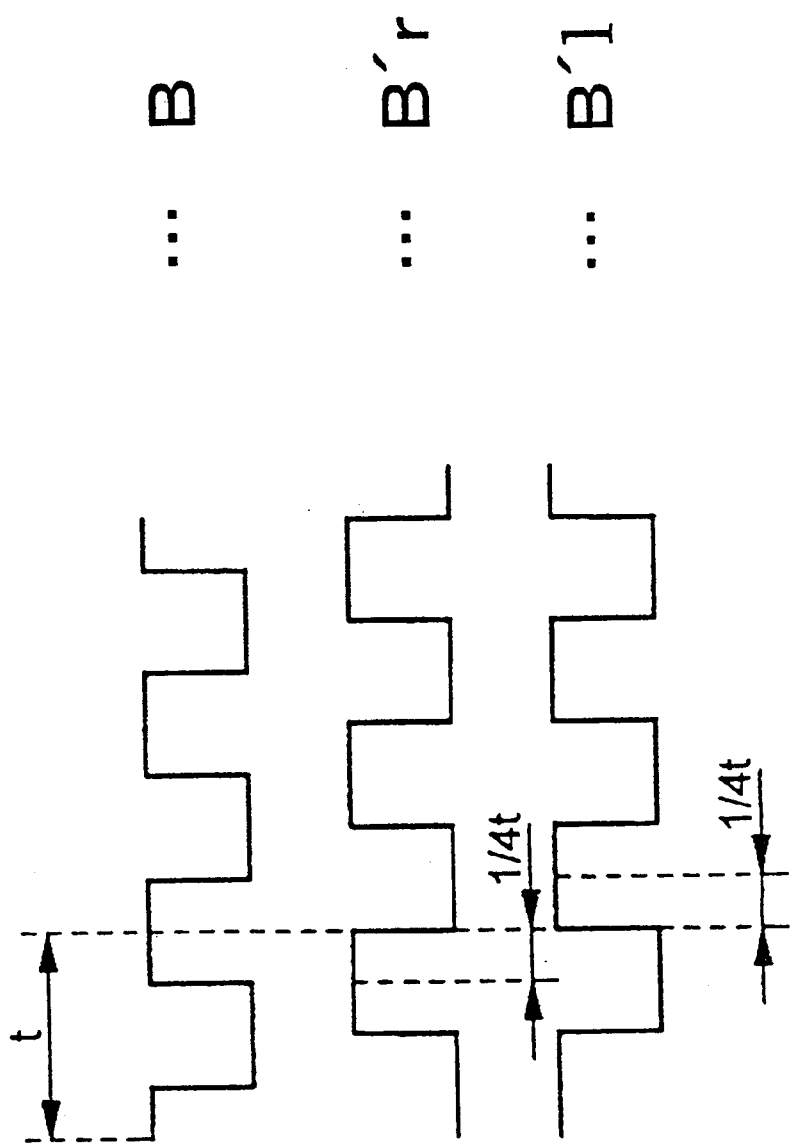
FIG. 8 is a view showing the pulse signal B generated by the pulse count detection sensor unit, and a pulse signals B'r and B'1 generated by the rotational direction detection sensor unit. The pulse signal B'r is generated by the rotational direction detection sensor unit when the rotating bezel is rotated clockwise, and the pulse signal B'1 is generated by the rotational direction detection sensor unit when the rotating bezel is rotated counterclockwise.

As shown in FIG. 8, when the rotating bezel 102 is rotated clockwise, the pulse signal produced by the rotational direction detection sensor unit 33 exhibits a ¼ advance in phase from the pulse signal produced by the pulse count detection sensor unit 32. when the rotating bezel 102 is rotated counterclockwise, the pulse signal produced by the rotational direction detection sensor unit 33 exhibits a ¼ delay in phase from the pulse signal produced by the pulse count detection sensor unit 32. By detecting such a phase advance or delay, the rotational direction of the rotating bezel 102 can be detected. A value of $\theta_1$ is not limited to $\theta_2+\theta_2/2=360/n+180/n$ as long as an angle is provided that produces a phase difference between the pulse signal generated by the pulse count detection sensor unit 32 and the pulse signal generated by the rotational direction detection sensor unit 33 as set forth above. In other words, $\theta_1$ may be any angle as long as it is different from k*360/n (k is an integer ranging from 0 to n−1).

Figure 9:
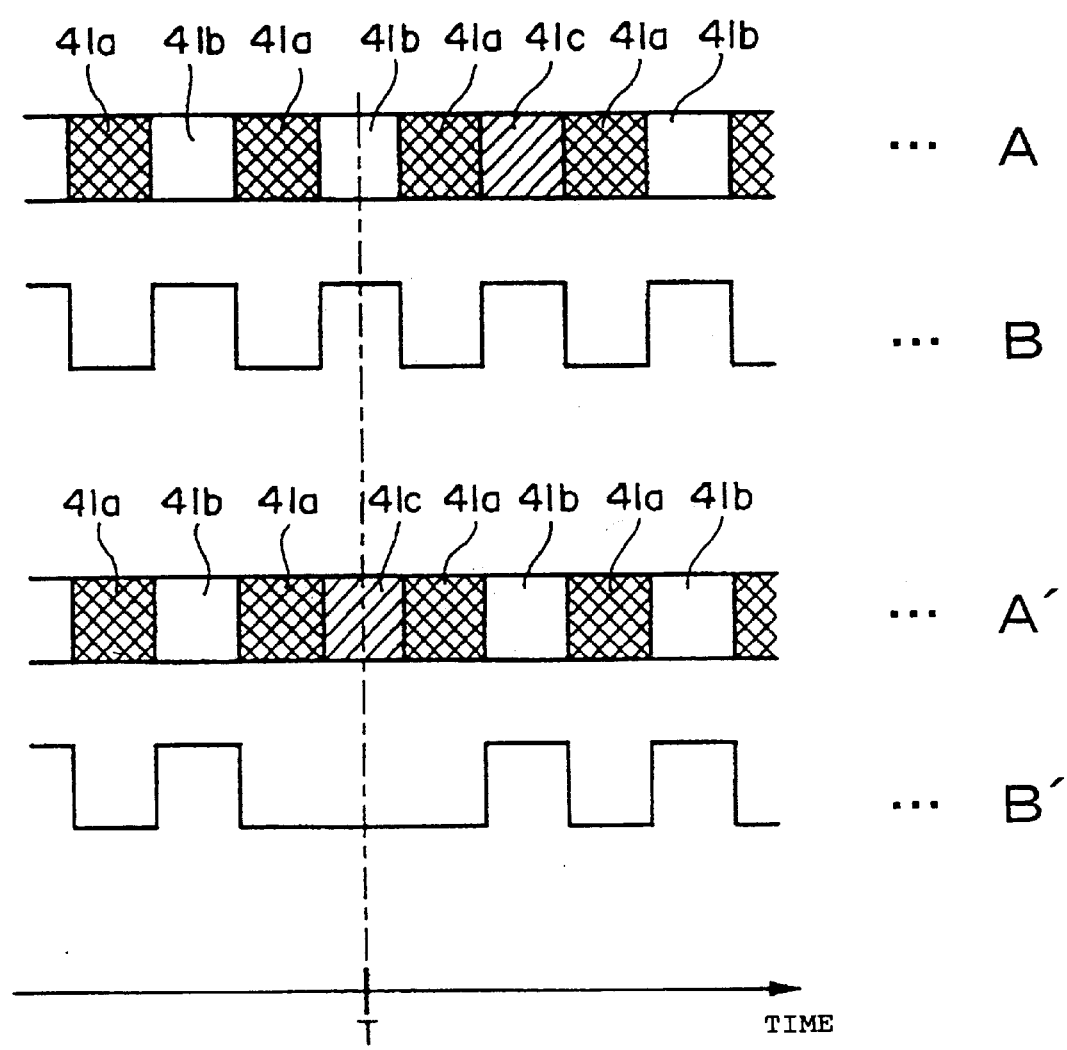
FIG. 9 is a diagram showing a relationship between the optical pattern A' on the home position detection sensor unit and the optical pattern A on the pulse count detection sensor unit, the pulse signal B' generated by the home position detection sensor unit and the pulse signal B generated by the pulse detection sensor unit, and time.

In this embodiment, the home position detection sensor unit 10 is disposed to provide $\theta_3=2\theta_2$. FIG. 9 is a diagram showing a relationship between optical patterns on the respective units, generated pulse signals, and time observed when the home position detection sensor unit 10 and the pulse count detection sensor unit 32 are disposed to provide $\theta_3=2\theta_2$. As shown in the drawing, when the pulse count detection sensor unit 32 is disposed under the absorbing region 41a, the home position detection sensor unit 10 is also disposed under the absorbing region 41a. When the pulse count detection sensor unit 32 is disposed under the reflecting region 41b, the home position detection sensor unit 10 is also disposed under the reflecting region 41b. Therefore, the pulse count detection sensor unit 32 and the home position detection sensor unit 10 generate pulse signals of the same level. However, at a timing denoted by T in the drawing, the home position detection sensor unit 10 is disposed under the visible light absorbing region 41c despite that the pulse count detection sensor unit 32 is disposed under the reflecting region 41b. In this case, an L-level signal is generated based on a quantity of light received by the photodiode 45 of the home position detection sensor unit 10, while an H-level signal is generated based on a quantity of light received by the photodiode 45 of the pulse count detection sensor unit 32. In other words, the pulse count detection sensor unit 32 and the home position detection sensor unit 10 generate different signals only when the visible light absorbing region 41c is disposed above the home position detection sensor unit 10. A value of $\theta_3$ is not limited to $2\theta_2$; any angle may be used as long as $2m\theta_2$ ("m" is an integer) is obtained.

Figure 10:
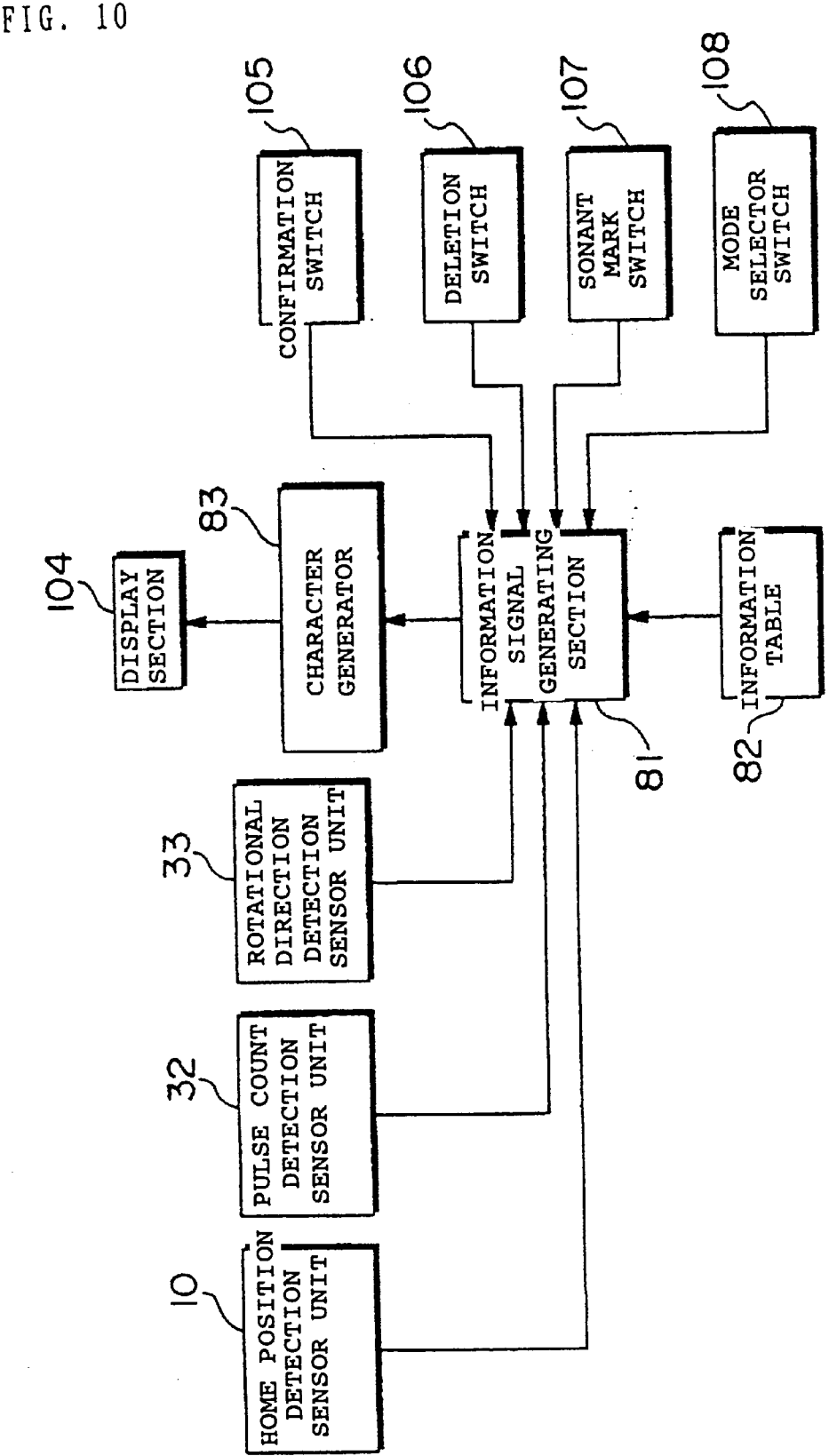
FIG. 10 is a block diagram showing a functional configuration for generating input information in the wristwatch type information processing device.

In conjunction with FIG. 10, descriptions will now be given of a functional configuration in which an amount of rotation and a direction of rotation of the rotating bezel 102 are detected from the pulse signals generated by the sensor units as described above, and input information is generated based on results of the detection. In the drawing, reference numeral 81 denotes an information signal generating section (a reference position detecting means, a rotation detecting means, and a signal generating means). The information signal generating section 81 has a pulse number counter, and detects an amount of rotation of the rotating bezel 102 by counting the number of pulses of a pulse signal generated by the pulse count detection sensor unit 32. Furthermore, the information signal generating section 81 judges phase delays or advances of individual pulse signals received from the pulse count detection sensor unit 32 and the rotational direction detection sensor unit 33 to thereby detect the rotational direction of the rotating bezel 102. Based on the amount of rotation and the direction of rotation of the rotating bezel 102 thus detected, an input information signal is generated. At this time, the information signal generating section 81 refers to an information table 82 wherein input information associated with an amount of rotation and a direction of rotation of the rotating bezel 102 has been stored beforehand, thereby producing an input information signal.

Furthermore, based on a pulse signal received from the home position detection sensor unit 10 and a pulse signal received from the pulse count detection sensor unit 32, the information signal generating section 81 detects a position at which the detection of an amount of rotation and a direction of rotation of the rotating bezel 102 is started, that is, a home position. To be more specific, pulse signals received from the individual sensor units are compared to detect a point at which a pulse signal of the pulse count detection sensor unit 32 is at the H-level, while a pulse signal of the home position detection sensor unit 10 is at the L-level, and the position of the rotating bezel 102 at that point is decided as the home position. When the home position is detected in this way, the pulse number counter is reset, and the number of pulses is counted from that point. In other words, the detection of the amount of rotation and the direction of rotation of the rotating bezel 102 is begun at the moment the home position is detected, and an input information signal is produced based on results of the detection.

Based on the input information signal thus produced by the information signal generating section 81, a character generator 83 displays information, such as characters, on the display section 104.

The mode selector switch 108 is a switch for switching between an input mode and a non-input mode of the wristwatch type information processing device 100. When the mode selector switch 108 is depressed, the wristwatch type information processing device 100 is set for the input mode, and a sentence saying "Turn the rotating bezel at least once" or the like is displayed on the display section 104. While the user is turning the rotating bezel 102 once, with the wristwatch type information processing device 100 set for the input mode, the information signal generating section 81 detects the home position as set forth above, enabling automatic input from that moment. When the mode selector switch 108 is depressed again in the input mode, the non-input mode is engaged.

The confirmation switch 105 and the deletion switch 106 are respectively used to confirm and delete input information generated by the information signal generating section 81. The sonant mark switch 107 is used to add a sonant mark when input information generated by the information signal generating section 81 is a kana character (the Japanese syllabary). In addition, when input information is an alphabetic character, the sonant mark switch 107 is used to switch between uppercase and lowercase.

The input information generated by the information signal generating section 81 is not limited to characters; it is also possible to generate command information, including one for character editing, such as line feed, and mode switching in the information processing device (e.g. switching between a time display mode and a character input mode). In this case, command information, such as one for the character editing or the mode switching, associated with an amount of rotation and a direction of rotation of the rotating bezel 102 has been stored in the information table 82. Based on the detected amount of rotation and the detected direction of rotation of the rotating bezel 102, the information signal generating section 81 produces command information.

A-2. Information Input Method and Operation

An information input method and operation of the wristwatch type information processing device 100 having the foregoing configuration will now be described. First, the user depresses the mode selector switch 108 to set the wristwatch type information processing device 100 for the input mode. This causes the LEDs 44 in the pulse count detection sensor unit 32 and the rotational direction detection sensor unit 33, and the LED 11 in the home position detection sensor unit 10 to apply detection light to the optical pattern 41. At the same time, a sentence saying "Turn the rotating bezel at least once" or the like, is displayed on the display section 104. Then, while the user is turning the rotating bezel 102 once, pulse signals from the home position detection sensor unit 10 and the pulse count detection sensor unit 32 are compared to thereby detect that the rotating bezel 102 has reached a position where a katakana character "a" is pointed at by the pointer mark 110 shown in FIG. 1. At this point, the pulse number counter of the information signal generating section 81 is reset, and the detection of an amount of rotation and a direction of rotation of the rotating bezel 102 is begun.

Figure 11:
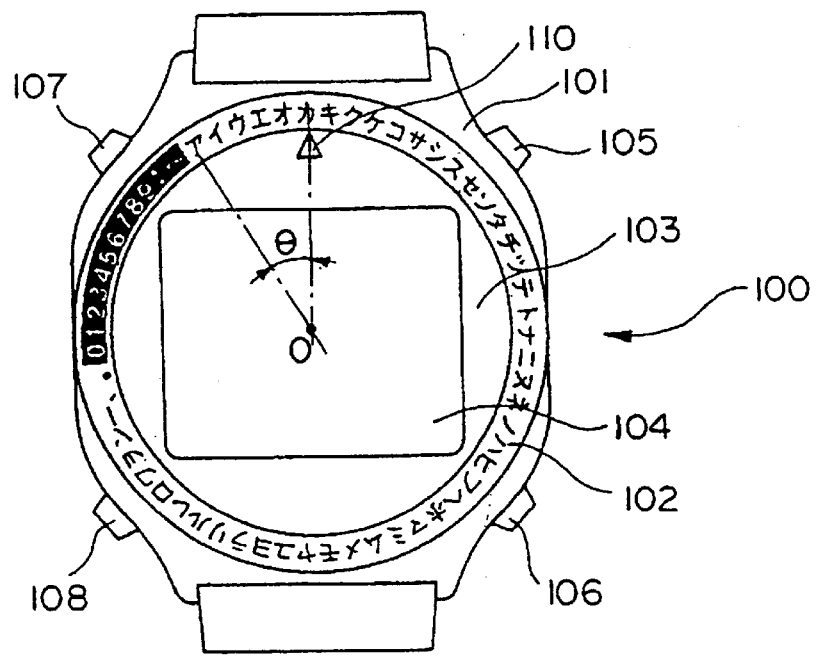
FIG. 11 is a diagram showing a state wherein the rotating bezel of the wristwatch type information processing device shown in FIG. 1 has been rotated by θ degrees.

Then, when the user wishes to enter information, for example, a katakana character "ka", the user turns the rotating bezel counterclockwise to a position where the pointer mark 110 points at "ka" formed on the top surface of the rotating bezel 102 as shown in FIG. 11. At this time, the pulse count detection sensor unit 32 detects the amount of rotation of the rotating bezel 102 from the home position, that is, the angle θ formed by the katakana characters "a" and "ka". At the same time, pulse signals of the pulse count detection sensor unit 32 and the rotational direction detection sensor unit 33 are compared to detect the direction of rotation of the rotating bezel 102.

Based on the amount of rotation and the direction of rotation thus detected, the input information "ka" is generated by the information signal generating section 81, and displayed on the display section 104. Depressing the confirmation switch 105 under this condition confirms the character "ka". Depressing the deletion switch 106 deletes "ka". If the sonant mark switch 107 is depressed, then "ga" is displayed on the display section 104.

The wristwatch type information processing device 100 according to this embodiment enables input of many pieces of information, including characters, and features a simple construction without the need for complicated mechanical switches or the like, thus permitting easy reduction of its size. Moreover, the sensor units, which are major components, are disposed in the holes 31a, 31b, and 31c formed in the main body 101, and the holes 31a, 31b, and 31c are hermetically sealed by the sensor cover glass 42 and the gasket 43, featuring good waterproof performance.

In a device, such as an optical encoder, adapted to detect an amount of rotation and a direction of rotation of a rotator by using optical sensors and to generate input information based on results of the detection, the input information associated with the amount of rotation and the direction of rotation of the rotator are stored in advance as set forth above. Therefore, it is necessary to detect the amount of rotation and the direction of rotation from a point at which the rotator is disposed at a predetermined reference position in relation to a support member, when information associated with characters or the like formed on a top surface of the rotator is entered. In the wristwatch type information processing device 100, at the moment the rotating bezel 102 passes the home position as the rotating bezel 102 is rotated by the user, the pulse number counter of the information signal generating section 81 is automatically reset, and an input information signal is generated based on a rotational angle and a rotational direction of the rotating bezel 102 from that moment. This arrangement obviates the need for performing a home position adjustment operation in which the rotating bezel 102 is brought to a home position before depressing the switch for instructing a start of the detection, thus permitting an easier input operation.

There is a conventional optical encoder equipped with a sensor for detecting a home position to automatically detect the home position; however, the encoder is provided with an optical pattern for detecting a home position that is formed concentrically with an optical pattern for detecting an amount of rotation and a direction of rotation of the rotator, making it difficult to reduce a size of the rotator. In the wristwatch type information processing device 100, the visible light absorbing region 41c, which is the optical pattern for detecting a home position, also serves as the optical pattern for detecting the amount of rotation and the direction of rotation of the rotating bezel 102, allowing a width of the rotating bezel 102 to be reduced. Hence, an application to a small device as in the case of this embodiment makes it easier to secure a sufficiently large space for the display section 104 or the like positioned on an inner periphery side of the rotating bezel 102 without adding to a size of the device.

In the embodiment described above, the visible light absorbing region 41c is disposed in place of the reflecting region 41b. Alternatively, however, the infrared light absorbing region (reference position region) that absorbs infrared light and reflects visible light may be disposed in place of the reflecting region 41b. In this case, it is required that the pulse count detection sensor unit 32 and the rotational direction detection sensor unit 33 apply visible light to the optical pattern 41, and the home position detection sensor unit 10 apply infrared light.

B. Second Embodiment

Figure 12:
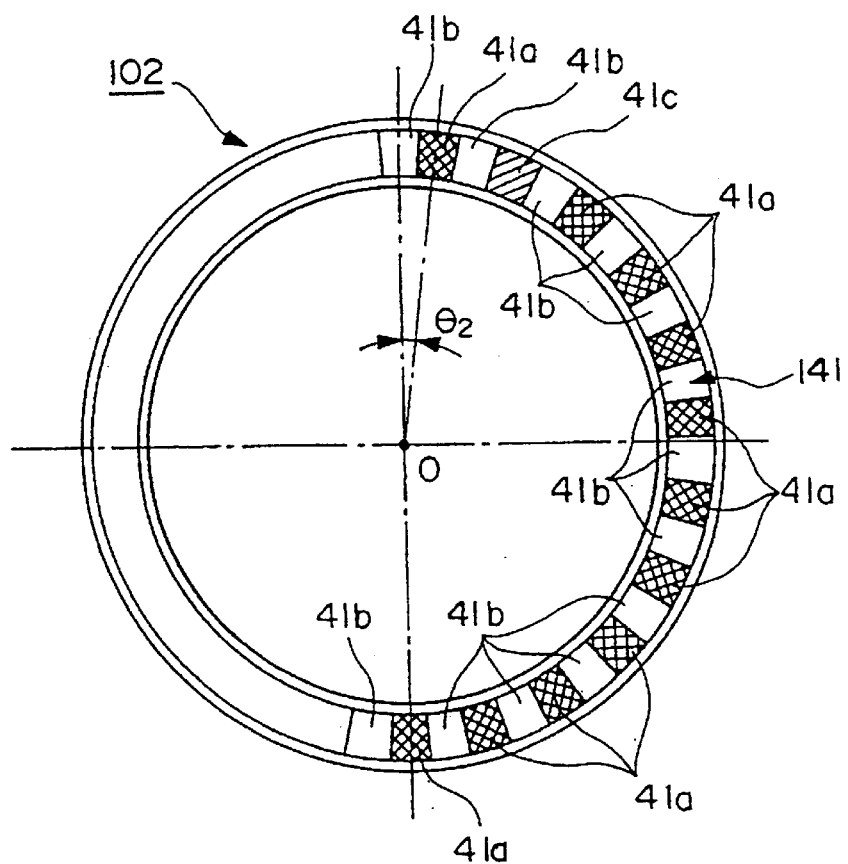
FIG. 12 is a diagram showing a bottom surface of the rotating bezel, which is a component of a wristwatch type information processing device according to a second embodiment of the present invention.

A wristwatch type information processing device according to a second embodiment of the present invention will now be described. This embodiment employs a rotating bezel 102 in which an optical pattern 141 as shown in FIG. 12 is formed in place of the optical pattern 41 in the first embodiment. As shown in the drawing, the optical pattern 141 has absorbing regions 41a and reflecting regions 41b that are alternately disposed, as in the case of the optical pattern 41, being different from the optical pattern 41 in that a visible light absorbing region (reference position region) 41c that reflects infrared light and absorbs visible light is disposed in place of one location where the absorbing region 41a is to be disposed.

Figure 13:
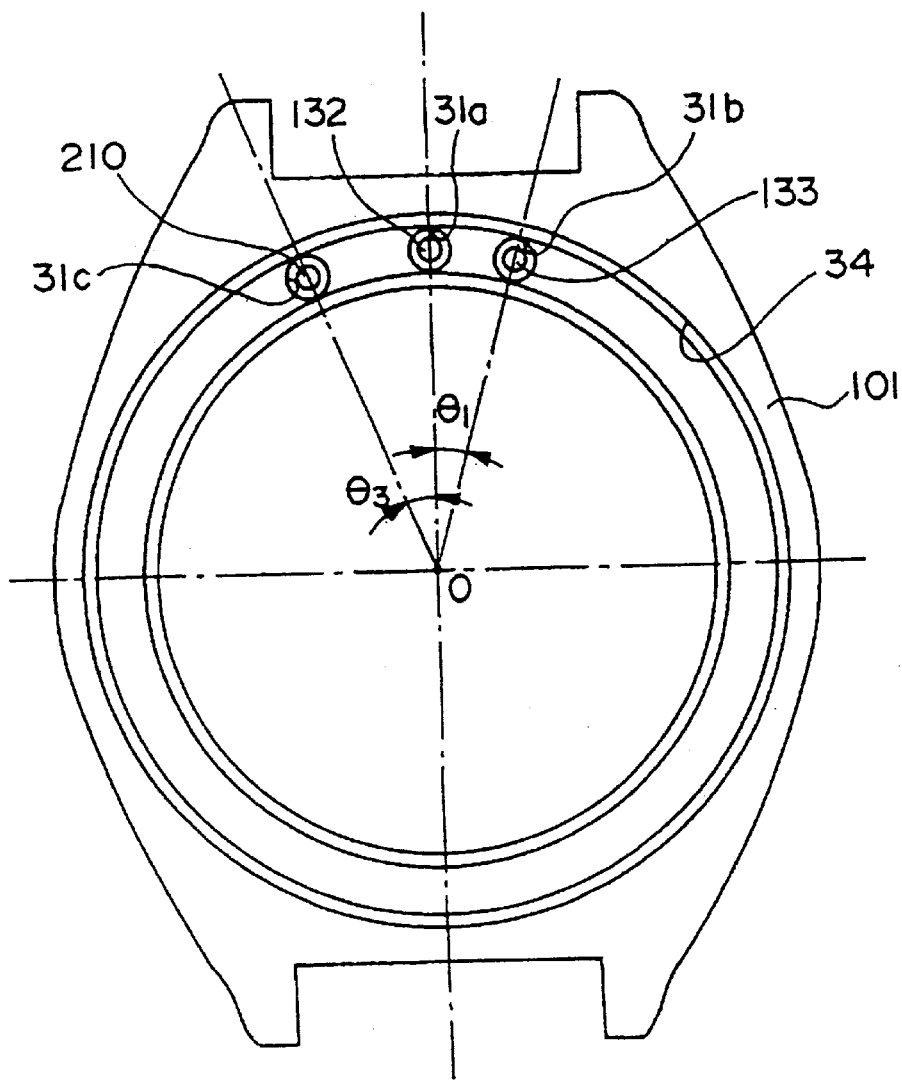
FIG. 13 is a diagram showing a state wherein the rotating bezel has been detached from the wristwatch type information processing device according to the second embodiment.

As shown in FIG. 13, a pulse count detection sensor unit (visible light sensor) 132, a rotational direction detection sensor unit (visible light sensor) 133, and a home position detection sensor unit (infrared sensor) 210 are disposed at the same positions as those in the first embodiment; however, they are different from those in the first embodiment in that the pulse count detection sensor unit 132 and the rotational direction detection sensor unit 133 are equipped with LEDs for applying visible light, and the home position detection sensor unit 210 is equipped with an LED for applying infrared light.

Figure 14:
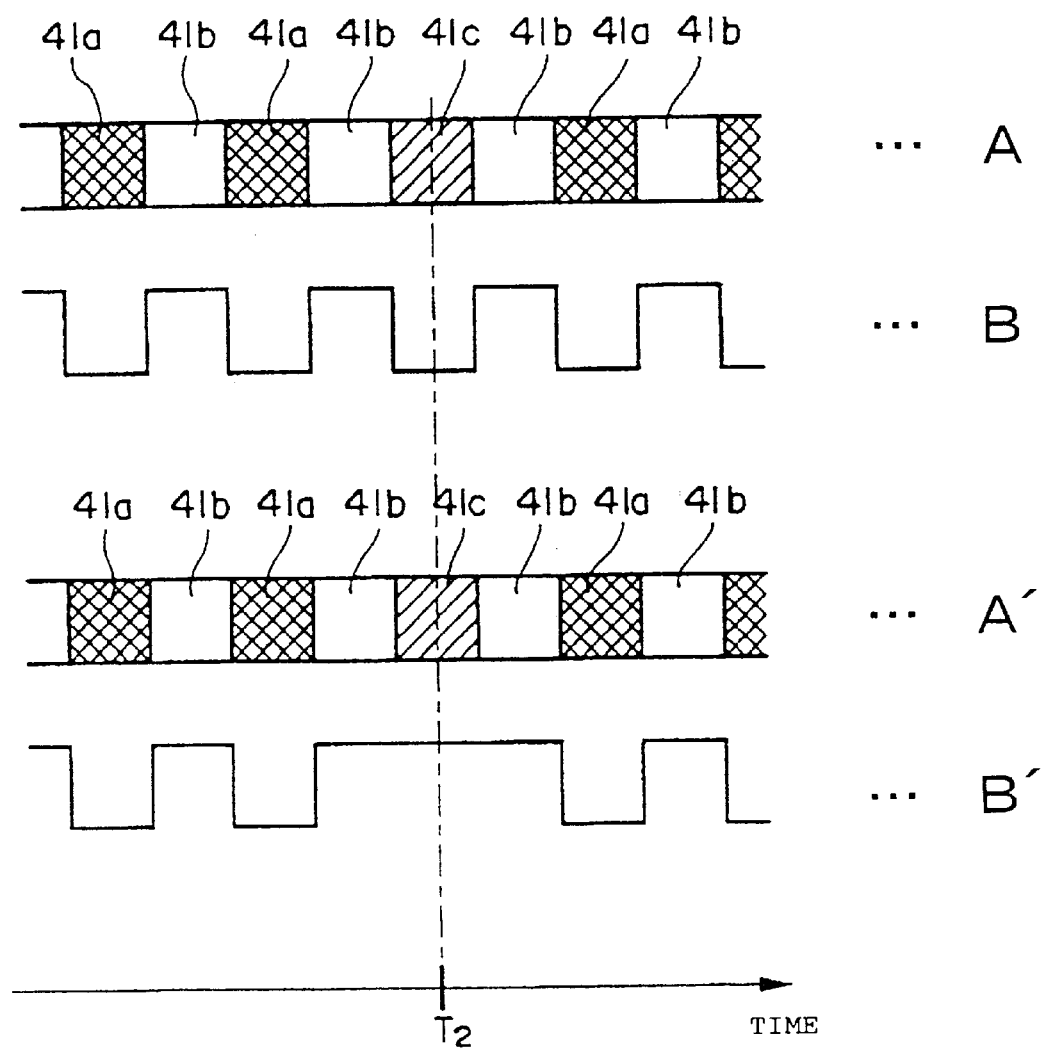
FIG. 14 is a diagram showing a relationship between an optical pattern A' on a home position detection sensor unit, which is a component of the wristwatch type information processing device according to the second embodiment and an optical pattern A on a pulse count detection sensor unit, a pulse signal B' generated by the home position detection sensor unit and a pulse signal B generated by the pulse count detection sensor unit, and time.

FIG. 14 is a diagram showing a relationship between optical patterns on the pulse count detection sensor unit 132 and the home position detection sensor unit 210, generated pulse signals, and time observed when the rotating bezel 102 is turned. As shown in the drawing, when the pulse count detection sensor unit 132 is disposed under the absorbing region 41a, the home position detection sensor unit 210 is also disposed under the absorbing region 41a. When the pulse count detection sensor unit 132 is disposed under the reflecting region 41b, the home position detection sensor unit 210 is also disposed under the reflecting region 41b. Therefore, the pulse count detection sensor unit 132 and the home position detection sensor unit 10 generate pulse signals of the same level. However, at a timing denoted by $T_2$ in the drawing, the home position detection sensor unit 210 is disposed under the visible light absorbing region 41c despite that the pulse count detection sensor unit 32 is disposed under the absorbing region 41a. In this case, an H-level signal is generated based on a quantity of light received by a photodiode 45 of the home position detection sensor unit 10, while an L-level signal is generated based on a quantity of light received by the photodiode 45 of the pulse count detection sensor unit 32. The pulse signals thus produced by the pulse count detection sensor unit 132 and the home position detection sensor unit 210 are compared, the information signal generating section 81 (refer to FIG. 10) detects a home position as in the case of the first embodiment, and detection of an amount of rotation and a direction of rotation of the rotating bezel 102 is started.

In the second embodiment, the visible light absorbing region 41c is disposed in place of the absorbing region 41a. Alternatively, however, an infrared light absorbing region (reference position region) that absorbs infrared light and reflects visible light may be disposed in place of the absorbing region 41a. In this case, it is required that the pulse count detection sensor unit 132 and the rotational direction detection sensor unit 133 apply infrared light to the optical pattern 41, and the home position detection sensor unit 210 apply visible light.

C. Third Embodiment

Figure 15:
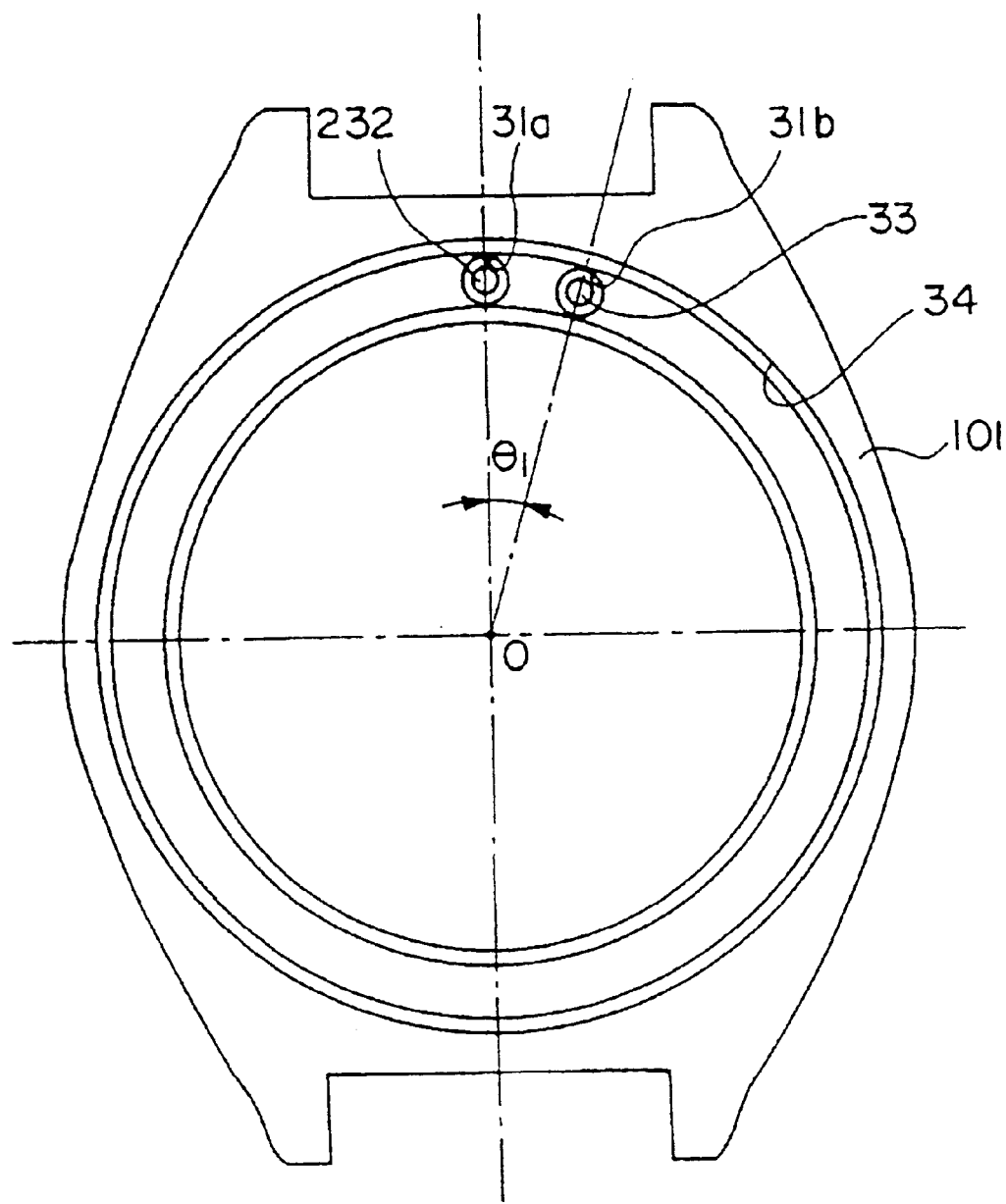
FIG. 15 is a diagram showing a state wherein the rotating bezel has been detached from the wristwatch type information processing device according to a third embodiment of the present invention.

A wristwatch type information processing device according to a third embodiment of the present invention will now be described. As shown in FIG. 15, this embodiment is different from the first embodiment in that a pulse count detection sensor unit (photosensor) 232 disposed in a hole 31a produces a pulse signal for detecting a home position in addition to a pulse signal for detecting an amount of rotation, without using the home position detection sensor unit 10.

Figure 16:
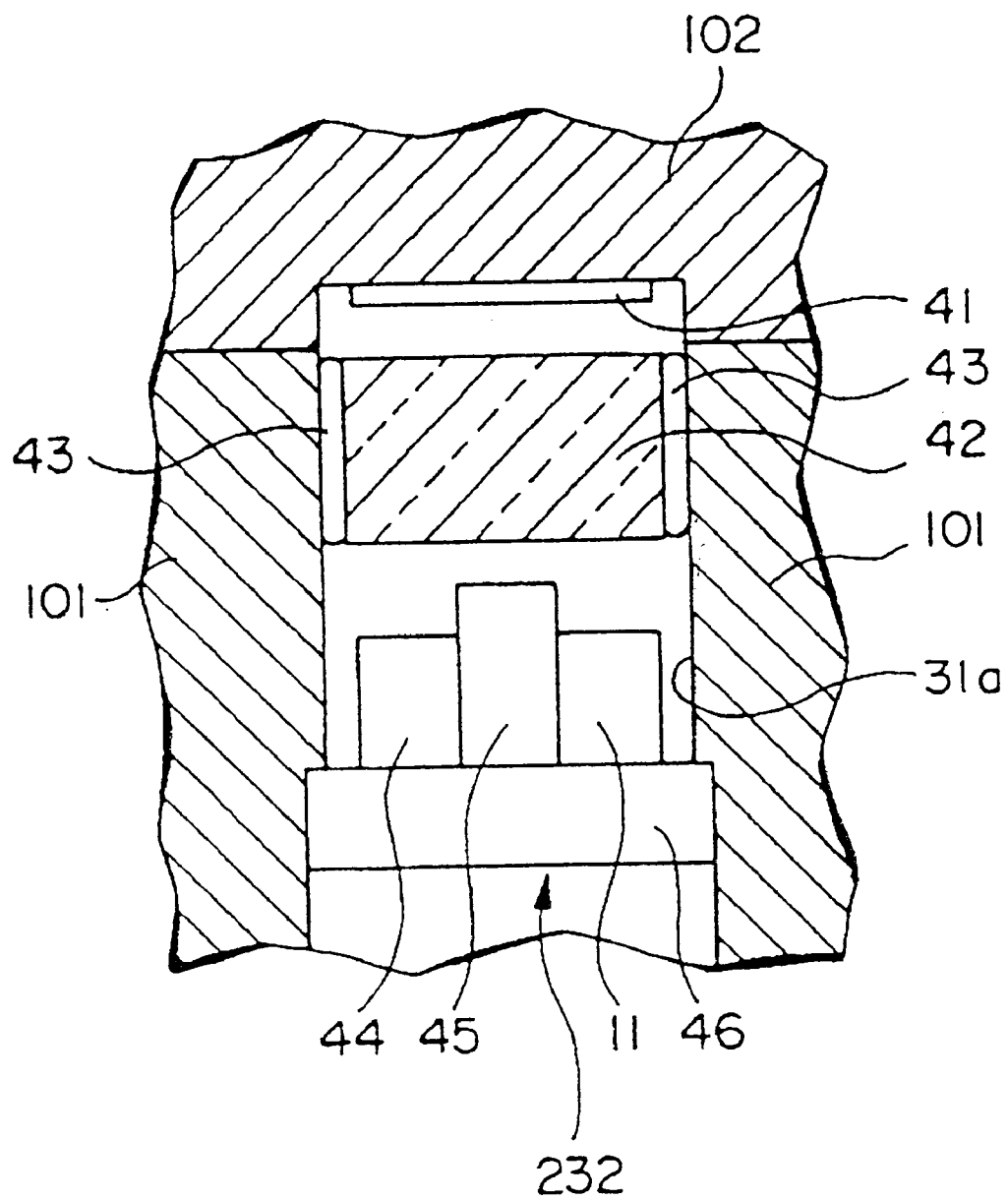
FIG. 16 is a sectional side elevation of a neighborhood of a pulse count detection sensor unit, which is a component of the wristwatch type information processing device according to the third embodiment.

FIG. 16 is a sectional side elevation of a neighborhood of the hole 31a in the wristwatch type information processing device. As shown in the drawing, the pulse count detection sensor unit 232 disposed in the hole 31a has an LED 44 for radiating infrared light, an LED 11 for radiating visible light, a photodiode 45 disposed therebetween, and a substrate 46.

In other words, the pulse count detection sensor unit 232 is able to apply infrared light and visible light to an optical pattern 41 formed on the rotating bezel 102.

The pulse count detection sensor unit 232 having the aforesaid configuration is adapted to produce a pulse signal for detecting an amount of rotation and a direction of rotation of a rotating bezel 102, and a pulse signal for detecting a home position. The following will describe methods for producing the two pulse signals by referring to FIG. 17.

Figure 17:
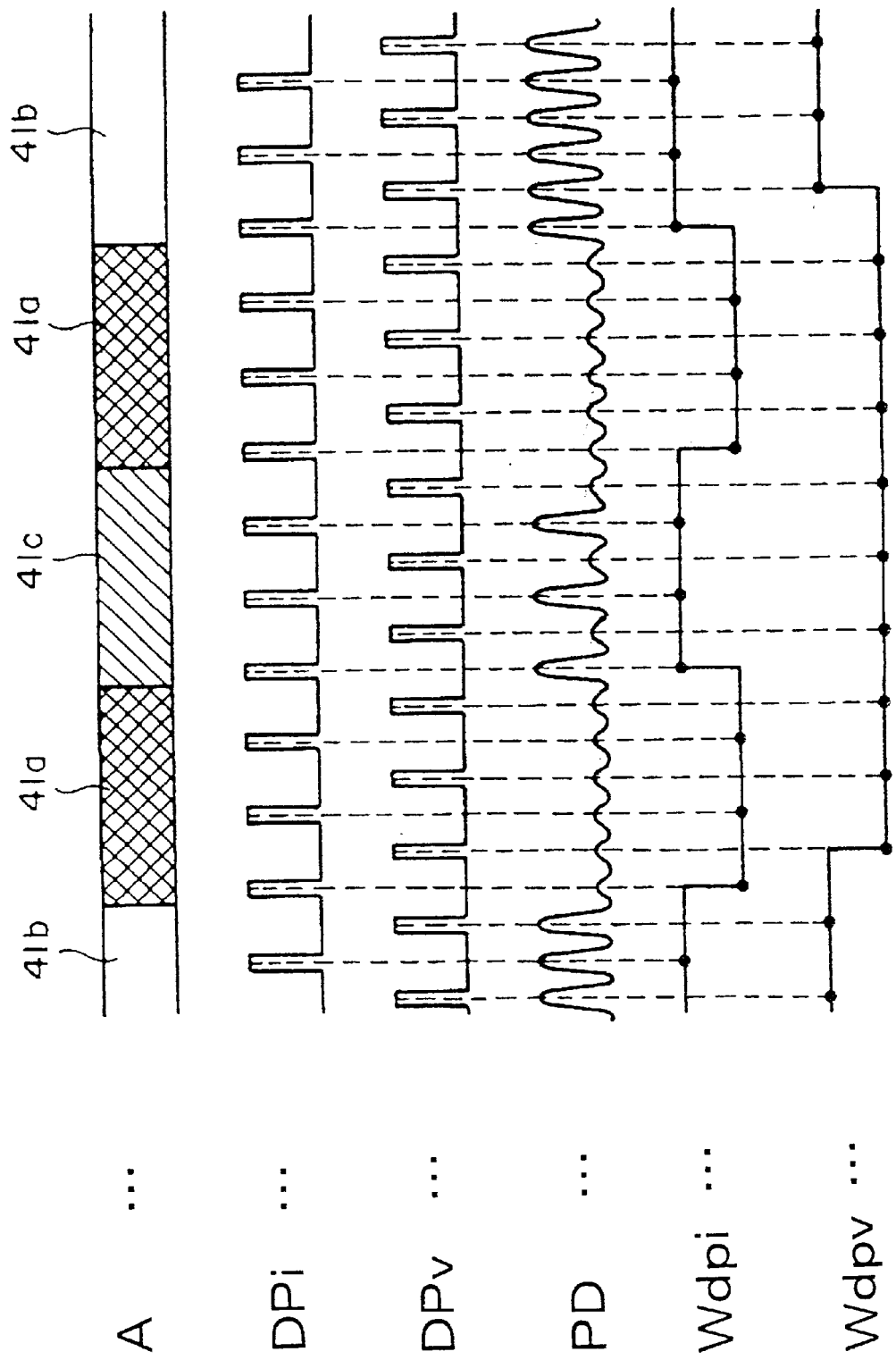
FIG. 17 is a diagram for explaining a method for generating two pulse signals by the pulse count detection sensor unit of the wristwatch type information processing device according to the third embodiment.

In the pulse count detection sensor unit 232, the LED 44 and the LED 11 are respectively pulse-driven at timings shown in FIG. 17. As illustrated in the drawing, the LED 44 and the LED 11 are alternately driven, and output values as shown in the drawing are obtained at the photodiode 45. The output values of the photodiode 45 are sample-held at a fixed timing while the LED 44 and the LED 11 are being driven, providing output waveforms sampled for the LED 44 and the LED 11, that is, infrared light and visible light, respectively. Then, the sample-held waveforms are compared with predetermined threshold values to produce pulse signals for the infrared light and the visible light, respectively.

Comparing the pulse signals thus obtained reveals that a value of a pulse signal generated at a moment when the visible light absorbing region 41c is read is different, thereby permitting a home position to be detected, as in the case of the first embodiment.

The amount of rotation of the rotating bezel 102 is detected based on a pulse signal corresponding to infrared light that is generated by the pulse count detection sensor unit 232. To detect the direction of rotation, a pulse signal corresponding to infrared light that is generated by the pulse count detection sensor unit 232 and a pulse signal generated by the rotational direction detection sensor unit 33 are compared. Based on a phase delay or advance between these signals, the direction of rotation is detected.

In the wristwatch type information processing device according to claim 3, the amount of rotation, the direction of rotation, and the home position of the rotating bezel 102 can be detected by the two sensor units, namely, the pulse count detection sensor unit 232 and the rotational direction detection sensor unit 33; therefore, there is no need for providing an additional sensor for detecting a home position, thus avoiding a complicated configuration. This arrangement permits easy reduction in size and power consumption, making the information processing device suited for a small apparatus of a wristwatch type, as in the case of this embodiment.

In the third embodiment, the visible light absorbing region 41c is disposed in place of the reflecting region 41b. Alternatively, however, the infrared light absorbing region that absorbs infrared light and reflects visible light may be disposed in place of the reflecting region 41b. In this case, it is required that the rotational direction detection sensor unit 33 apply visible light to the optical pattern 41.

Furthermore, in the third embodiment, the visible light absorbing region 41c is disposed in one location at a position where the reflecting region 41b is to be disposed, among the absorbing regions 41a and the reflecting regions 41b that are alternately disposed; however, the visible light absorbing region 41c may alternatively be disposed in place of one location at a potion where the absorbing region 41a is to be disposed. In this case, a rotational direction detection sensor unit 133 equipped with an LED radiating visible light is employed instead of the rotational direction detection sensor unit 33, and a pulse signal corresponding to visible light that is generated by the pulse count detection sensor unit 232 and a pulse signal generated by the rotational direction detection sensor unit 133 are compared to detect a direction of rotation of the rotating bezel 102. An amount of rotation of the rotating bezel 102 is detected based on the pulse signal corresponding to visible light that is generated by the pulse count detection sensor unit 232. In this case also, the infrared light absorbing region may be disposed in place of one location at a position where the absorbing region 41a is to be disposed. At this time, the rotational direction detection sensor unit 33 that radiates infrared light may be employed in place of the rotational direction detection sensor unit 133.

D. Examples of Modifications

The present invention is not limited to various embodiments described above, but the invention is intended to cover diverse modifications described below.

(1) In the first to third embodiments set forth above, the position where the katakana character "a" formed on the top surface of the rotating bezel 102 is pointed at by the pointer mark 110 (refer to FIG. 19 is established as the home position. Alternatively, however, a position where another character is pointed at by the pointer mark 110 may be established as the home position. For example, a mark other than a character, which indicates a home position, may be formed on the top surface of the rotating bezel 102, and a position where the home position mark is pointed at by the pointer mark 110 may be established as the home position. In this case, it is necessary to store input information associated with an amount of rotation and a direction of rotation from the home position in the information table 82 so that input information, such as a character, pointed at by the pointer mark 110 is generated.

(2) In the first to third embodiments set forth above, the visible light absorbing region 41c is formed at one location; alternatively, however, a plurality of the visible light absorbing regions 41c may be formed. Disposing a plurality of visible light absorbing regions (reference position regions) 41c in the optical pattern 41 makes it possible to set a plurality of home positions. Hence, for instance, as shown in FIG. 18, when a rotating bezel (rotator) 180 wherein a string of characters "1, 2, 3, . . . , *,/,=" is formed at two places is employed, if one location, e.g. a position where "1", among the characters "1, 2, 3, . . . , *,/,=" is pointed at by the pointer mark 110 is established as a home position, then the rotating bezel 180 may be turned to a closer home position to engage the input mode, leading to greater ease of operation.

(3) Furthermore, it is also possible to provide the first to third embodiments with a kanji (Chinese character) conversion feature for converting an entered character into a kanji.

(4) Moreover, the present invention is not limited to the wristwatch type information processing device described above; the invention may be also applied to other type of information processing device, such as a portable telephone. In this case, as a rotator, a disk-shaped rotator may be used in addition to a rotating bezel.

As described above, according to the present invention, the detection of an amount of rotation and a direction of rotation can be automatically started when a rotator reaches a reference position; hence, it is possible to enter information further reliably by an easy operation. Moreover, the same space can be shared by an optical pattern for detecting a reference position and an optical pattern for detecting an amount of rotation and a direction of rotation, thus permitting an apparatus to be easily made smaller.

Furthermore, there is no need for providing a separate sensor dedicated for detecting a reference position, making easy to reduce a size and power consumption.

Moreover, it is possible to provide a plurality of reference positions serving as the positions at which the detection of the amount of rotation and the direction of rotation of the rotator is started, permitting greater ease of operation.

In addition, sensors or the like, which are major parts, are disposed in a hermetically sealed space, exhibiting good waterproof feature. The wristwatch design provides outstanding portability.

What is claimed is:

1. An information processing device comprising:
    a support member;
    a rotator rotatably provided on the support member;
    an optical pattern having a reflecting region for reflecting visible light and infrared light and an absorbing region for absorbing the visible light and the infrared light, which are alternately disposed along a rotation circumference of the rotator, and a reference position region disposed in place of one of the reflecting regions and which reflects the infrared light and absorbs the visible light;
    an infrared light sensor provided on the support member and which applies the infrared light to the optical pattern and receives the reflected light;
    a visible light sensor provided on the support member and which applies the visible light to the optical pattern and receives the reflected light;

reference position detector for detecting the reference position region based on a quantity of received light of the infrared light sensor and a quantity of received light of the visible light sensor;

rotation detector for detecting, based on the quantity of the received light of the infrared light sensor, an amount of rotation of the rotator from a moment when the reference position region is detected by the reference position detector, and a direction of rotation of the rotator;

signal generator for generating an information signal based on the amount of rotation and the direction of rotation of the rotator detected by the rotation detector; and a display for displaying information corresponding to the information signal generated by the signal generator.

2. An information processing device comprising:

a support member;

a rotator rotatably provided on the support member;

an optical pattern having a reflecting region for reflecting visible light and infrared light and an absorbing region for absorbing the visible light and the infrared light, which are alternately disposed along a rotation circumference of the rotator, and a reference position region disposed in place of one of the reflecting regions and which reflects the visible light and absorbs the infrared light;

an infrared light sensor provided on the support member and which applies the infrared light to the optical pattern and receives the reflected light;

a visible light sensor provided on the support member and which applies the visible light to the optical pattern and receives the reflected light;

reference position detector for detecting the reference position region based on a quantity of received light of the infrared light sensor and a quantity of received light of the visible light sensor;

rotation detector for detecting, based on the quantity of the received light of the visible light sensor, an amount of rotation of the rotator from a moment when the reference position region is detected by the reference position detector, and a direction of rotation of the rotator;

signal generator for generating an information signal based on the amount of rotation and the direction of rotation of the rotator detected by the rotation detector; and a display for displaying information corresponding to the information signal generated by the signal generator.

3. An information processing device comprising:

a support member;

a rotator rotatably provided on the support member;

an optical pattern having a reflecting region for reflecting visible light and infrared light and an absorbing region for absorbing the visible light and the infrared light, which are alternately disposed along a rotation circumference of the rotator, and a reference position region disposed in place of one of the absorbing regions and which reflects the infrared light and absorbs the visible light;

an infrared light sensor provided on the support member and which applies the infrared light to the optical pattern and receives the reflected light;

a visible light sensor provided on the support member and which applies the visible light to the optical pattern and receives the reflected light;

reference position detector for detecting the reference position region based on a quantity of the received light of the infrared light sensor and a quantity of the received light of the visible light sensor;

rotation detector for detecting, based on the quantity of received light of the visible light sensor, an amount of rotation of the rotator from a moment when the reference position region is detected by the reference position detector, and a direction of rotation of the rotator;

signal generator for generating an information signal based on the amount of rotation and the direction of rotation of the rotator detected by the rotation detector means; and a display for displaying information corresponding to the information signal generated by the signal generator.

4. An information processing device comprising:

a support member;

a rotator rotatably provided on the support member;

an optical pattern having a reflecting region for reflecting visible light and infrared light and an absorbing region for absorbing the visible light and the infrared light, which are alternately disposed along a rotation circumference of the rotator, and a reference position region disposed in place of one of the absorbing regions and which reflects the visible light and absorbs the infrared light;

an infrared light sensor provided on the support member and which applies the infrared light to the optical pattern and receives the reflected light;

a visible light sensor provided on the support member and which applies the visible light to the optical pattern and receives the reflected light;

reference position detector for detecting the reference position region based on a quantity of received light of the infrared light sensor and a quantity of received light of the visible light sensor;

rotation detector for detecting, based on the quantity of the received light of the infrared light sensor, an amount of rotation of the rotator from a moment when the reference position region is detected by the reference position detector, and a direction of rotation of the rotator;

signal generating means for generator an information signal based on the amount of rotation and the direction of rotation of the rotator detected by the rotation detector; and a display for displaying information corresponding to the information signal generated by the signal generator.

5. An information processing device according to claim 1, wherein the rotator is an annular rotating bezel;

the support member is formed to be a wristwatch type having a main body section and a band section that can be wrapped around a wrist of a user; and the main body section has a hermetically sealed space wherein the infrared light sensor and the visible light sensor are disposed.

6. An information processing device comprising:

a support member;

a rotator rotatably provided on the support member;

an optical pattern having a reflecting region for reflecting visible light and infrared light and an absorbing regions for absorbing the visible light and the infrared light, which are alternately disposed along a rotation circumference of the rotator, and a reference position region disposed in place of one of the reflecting regions and which reflects the infrared light and absorbs the visible light;

a photosensor provided on the support member and which has a luminescent element that applies the infrared light and the visible light to the optical pattern, and a light-receiving element that receives reflected light from the optical pattern;

reference position detector for detecting the reference position region based on a quantity of received infrared light and a quantity of received visible light in the light-receiving element of the photosensor;

rotation detector for detecting, based on a quantity of the received infrared light in the light-receiving element of the photosensor, an amount of rotation of the rotator from a moment when the reference position region is detected by the reference position detector, and a direction of rotation of the rotator;

signal generator for generating an information signal based on the amount of rotation and the direction of rotation of the rotator detected by the rotation detector; and a display for displaying information corresponding to the information signal generated by the signal generator.

7. An information processing device comprising:

a support member;

a rotator rotatably provided on the support member;

an optical pattern having a reflecting region for reflecting visible light and infrared light and an absorbing region for absorbing the visible light and the infrared light, which are alternately disposed along a rotation circumference of the rotator, and a reference position region disposed in place of one of the reflecting regions and which reflects the visible light and absorbs the infrared light;

a photosensor provided on the support member and which has a luminescent element that applies the infrared light and the visible light to the optical pattern, and a light-receiving element that receives reflected light from the optical pattern;

reference position detector for detecting the reference position region based on a quantity of received infrared light and a quantity of received visible light in the light-receiving element of the photosensor;

rotation detector for detecting, based on a quantity of the received visible light in the light-receiving element of the photosensor, an amount of rotation of the rotator from a moment when the reference position region is detected by the reference position detector, and a direction of rotation of the rotator;

signal generator for generating an information signal based on the amount of rotation and the direction of rotation of the rotator detected by the rotation detector; and a display for displaying information corresponding to the information signal generated by the signal generator.

8. An information processing device comprising:

a support member;

a rotator rotatably provided on the support member;

an optical pattern having a reflecting region for reflecting visible light and infrared light and an absorbing region for absorbing the visible light and the infrared light, which are alternately disposed along a rotation circumference of the rotator, and a reference position region disposed in place of one of the absorbing regions and which reflects the infrared light and absorbs the visible light;

a photosensor provided on the support member and which has a luminescent element that applies the infrared light and the visible light to the optical pattern, and a light-receiving element that receives reflected light from the optical pattern;

reference position detector for detecting the reference position region based on a quantity of received infrared light and a quantity of received visible light in the light-receiving element of the photosensor;

rotation detector for detecting, based on a quantity of the received visible light in the light-receiving element of the photosensor, an amount of rotation of the rotator from a moment when the reference position region is detected by the reference position detector, and a direction of rotation of the rotator;

signal generator for generating an information signal based on the amount of rotation and the direction of rotation of the rotator detected by the rotation detector; and a display for displaying information corresponding to the information signal generated by the signal generator.

9. An information processing device comprising:

a support member;

a rotator rotatably provided on the support member;

an optical pattern having a reflecting region for reflecting visible light and infrared light and an absorbing region for absorbing the visible light and the infrared light, which are alternately disposed along a rotation circumference of the rotator, and a reference position region disposed in place of one of the absorbing regions and which reflects the visible light and absorbs the infrared light;

a photosensor provided on the support member and which has a luminescent element that applies the infrared light and the visible light to the optical pattern, and a light-receiving element that receives reflected light from the optical pattern;

reference position detector for detecting the reference position region based on a quantity of received infrared light and a quantity of received visible light in the light-receiving element of the photosensor;

rotation detector for detecting, based on a quantity of the received infrared light in the light-receiving element of the photosensor, an amount of rotation of the rotator from a moment when the reference position region is detected by the reference position detector, and a direction of rotation of the rotator;

signal generator for generating an information signal based on the amount of rotation and the direction of rotation of the rotator detected by the rotation detector; and a display for displaying information corresponding to the information signal generated by the signal generator.

10. An information processing device according to claim 6, wherein the rotator is an annular rotating bezel;

the support member is formed to be a wristwatch type having a main body section and a band section that can be wrapped around a wrist of a user; and the main body section has a hermetically sealed space wherein the photosensor is disposed.

11. An information processing device according to claim 1, wherein a plurality of the reference position regions are disposed in place of any one of the reflecting regions.

12. An information processing device according to claim 3, wherein a plurality of the reference position regions are disposed in place of any one of the absorbing regions.

13. An information processing device according to claim 2, wherein the rotator is an annular rotating bezel;

the support member is formed to be a wristwatch type having a main body section and a band section that can be wrapped around a wrist of a user; and the main body section has a hermetically sealed space wherein the infrared light sensor and the visible light sensor are disposed.

14. An information processing device according to claim 3, wherein the rotator is an annular rotating bezel;

the support member is formed to be a wristwatch type having a main body section and a band section that can be wrapped around a wrist of a user; and the main body section has a hermetically sealed space wherein the infrared light sensor and the visible light sensor are disposed.

15. An information processing device according to claim 4, wherein the rotator is an annular rotating bezel;

the support member is formed to be a wristwatch type having a main body section and a band section that can be wrapped around a wrist of a user; and the main body section has a hermetically sealed space wherein the infrared light sensor and the visible light sensor are disposed.

16. An information processing device according to claim 7, wherein the rotator is an annular rotating bezel;

the support member is formed to be a wristwatch type having a main body section and a band section that can be wrapped around a wrist of a user; and the main body section has a hermetically sealed space wherein the photosensor is disposed.

17. An information processing device according to claim 8, wherein the rotator is an annular rotating bezel;

the support member is formed to be a wristwatch type having a main body section and a band section that can be wrapped around a wrist of a user; and the main body section has a hermetically sealed space wherein the photosensor is disposed.

18. An information processing device according to claim 9, wherein the rotator is an annular rotating bezel;

the support member is formed to be a wristwatch type having a main body section and a band section that can be wrapped around a wrist of a user; and the main body section has a hermetically sealed space wherein the photosensor is disposed.

19. An information processing device according to claim 2, wherein a plurality of the reference position regions are disposed in place of any one of the reflecting regions.

20. An information processing device according to claim 6, wherein a plurality of the reference position regions are disposed in place of any one of the reflecting regions.

21. An information processing device according to claim 7, wherein a plurality of the reference position regions are disposed in place of any one of the reflecting regions.

22. An information processing device according to claim 4, wherein a plurality of the reference position regions are disposed in place of any one of the absorbing regions.

23. An information processing device according to claim 8, wherein a plurality of the reference position regions are disposed in place of any one of the absorbing regions.

24. An information processing device according to claim 9, wherein a plurality of the reference position regions are disposed in place of any one of the absorbing regions.

* * * * *

UNITED STATES PATENT AND TRADEMARK OFFICE
CERTIFICATE OF CORRECTION

PATENT NO.    : 6,407,379 B1                                              Page 1 of 1
DATED         : June 18, 2002
INVENTOR(S)   : Akira Shinbo It is certified that error appears in the above-identified patent and that said Letters Patent is hereby corrected as shown below:

<u>Column 18,</u>
Line 45, change "generating means" to -- generator --

Signed and Sealed this

Fifth Day of November, 2002

*Attest:*

*Attesting Officer*

JAMES E. ROGAN
*Director of the United States Patent and Trademark Office*